(12) United States Patent
Newman et al.

(10) Patent No.: US 11,550,333 B2
(45) Date of Patent: Jan. 10, 2023

(54) SYSTEMS AND METHODS TO APPLY MARKINGS

(71) Applicant: CASE WESTERN RESERVE UNIVERSITY, Cleveland, OH (US)

(72) Inventors: Wyatt S. Newman, Cleveland, OH (US); Samuel A. Bell, Cleveland Heights, OH (US)

(73) Assignee: CASE WESTERN RESERVE UNIVERSITY, Cleveland, OH (US)

(*) Notice: Subject to any disclaimer, the term of this patent is extended or adjusted under 35 U.S.C. 154(b) by 255 days.

(21) Appl. No.: 16/803,793

(22) Filed: Feb. 27, 2020

(65) Prior Publication Data
US 2020/0201350 A1 Jun. 25, 2020

Related U.S. Application Data

(63) Continuation-in-part of application No. PCT/US2018/049118, filed on Aug. 31, 2018.
(Continued)

(51) Int. Cl.
G05D 1/02 (2020.01)
E01F 9/576 (2016.01)
(Continued)

(52) U.S. Cl.
CPC ........... *G05D 1/0246* (2013.01); *E01C 23/16* (2013.01); *E01F 9/576* (2016.02); *G06V 20/588* (2022.01);
(Continued)

(58) Field of Classification Search
CPC ............... G05D 1/0246; G05D 1/0278; G05D 2201/0202; E01C 23/16; E01F 9/576; G06K 9/00798; G06V 20/588
See application file for complete search history.

(56) References Cited

U.S. PATENT DOCUMENTS 5,529,433 A 6/1996 Huynh et al.
6,074,693 A 6/2000 Manning
(Continued)

FOREIGN PATENT DOCUMENTS

DE 102008017504 A1 1/2010
EP 1322428 B1 5/2005
(Continued)

OTHER PUBLICATIONS

Florin Oniga, et al.; "Curb Detection for Driving Assistance Systems: A Cubic S;ine-Based Approach"; 2011 IEEE Intelligent Vehicles Symposium (IV); Jun. 5-9, 2011; 6 pgs.
(Continued)

*Primary Examiner* — Hunter B Lonsberry
*Assistant Examiner* — Harrison Heflin
(74) *Attorney, Agent, or Firm* — Tarolli, Sundheim, Covell & Tummino LLP

(57) ABSTRACT

An example method includes storing marking data to specify at least one selected marking to apply at a target location along a vehicle path of travel, the marking data including a machine-readable description and a marking reference coordinate frame for the selected marking. The method also includes generating task plan data to apply the selected marking based on the marking data and at least one parameter of an application tool. The method also includes determining a location and orientation of the application tool with respect to the vehicle path of travel based on location data representing a current location of a vehicle carrying the application tool. The method also includes computing a joint-space trajectory to enable the application tool to apply the selected marking at the target location based on the task plan data and the determined location of the application tool.

27 Claims, 8 Drawing Sheets

Related U.S. Application Data

(60) Provisional application No. 62/567,621, filed on Oct. 3, 2017, provisional application No. 62/552,924, filed on Aug. 31, 2017.

(51) Int. Cl.
*E01C 23/16* (2006.01)
*G06V 20/56* (2022.01)

(52) U.S. Cl.
CPC ... *G05D 1/0278* (2013.01); *G05D 2201/0202* (2013.01)

(56) References Cited

U.S. PATENT DOCUMENTS

| | | | |
|---|---|---|---|
| 6,240,342 B1 | 5/2001 | Fiegert et al. | |
| 6,299,934 B1 | 10/2001 | Manning | |
| 6,951,375 B2 * | 10/2005 | Patton | B41J 3/28 347/3 |
| 7,029,199 B2 | 4/2006 | Mayfield et al. | |
| 8,291,855 B2 * | 10/2012 | Hoerl, Jr | B05B 12/14 118/323 |
| 8,935,057 B2 | 1/2015 | Dolinar et al. | |
| 9,035,981 B2 * | 5/2015 | Dal Col | B41J 3/407 347/110 |
| 9,298,991 B2 | 3/2016 | Dolinar et al. | |
| 9,598,826 B2 * | 3/2017 | Grimm | E01C 23/222 |
| 10,104,836 B2 * | 10/2018 | Jamison | A01C 21/005 |
| 10,268,202 B1 * | 4/2019 | Casale | G05D 1/0274 |
| 10,773,174 B1 * | 9/2020 | Mullin | A63H 30/04 |
| 10,960,545 B2 * | 3/2021 | Kristensen | B25J 9/1684 |
| 2001/0024596 A1 | 9/2001 | Sanfilippo et al. | |
| 2010/0328054 A1 | 12/2010 | Yim et al. | |
| 2011/0039021 A1 * | 2/2011 | Persson | A63C 19/065 427/137 |
| 2013/0190981 A1 | 7/2013 | Dolinar et al. | |
| 2013/0310971 A1 * | 11/2013 | Prouty | E01C 23/163 700/245 |
| 2013/0330467 A1 * | 12/2013 | Bond | E21D 11/10 118/695 |
| 2014/0267703 A1 | 9/2014 | Taylor et al. | |
| 2016/0016312 A1 * | 1/2016 | Lawrence, III | B23Q 17/2233 700/98 |
| 2016/0209511 A1 * | 7/2016 | Dolinar | G06K 9/6278 |
| 2017/0212058 A1 | 7/2017 | Akselrod et al. | |
| 2017/0323129 A1 | 11/2017 | Davidson et al. | |
| 2017/0341231 A1 * | 11/2017 | Tan | B25J 9/162 |
| 2017/0341236 A1 * | 11/2017 | Patrick | B25J 13/081 |
| 2019/0118370 A1 * | 4/2019 | Rennuit | B25J 5/04 |

FOREIGN PATENT DOCUMENTS

| | | |
|---|---|---|
| KR | 10-2018-0093313 A | 8/2018 |
| WO | 2016127174 A1 | 8/2016 |

OTHER PUBLICATIONS

Jung-Won Kim, et al.; "Traffic Road Line Detection Based on the Vanishing Point and Contour Information"; SICE Annual Conference 2011; Sep. 13-18, 2011; Waseda University, Tokyo, Japan; 4 pgs.

B. Qin, et al.; "Curb-Intersection Feature Based Monte Carlo Localization on Urban Roads"; 2012 IEEE International Conference on Robotics and Automation; May 14-18, 2012; 7 pgs.

Markus Schreiber, et al.; "LaneLoc: Lane Marking Based Localization using Highly Accurate Maps"; 2013 IEEE Intelligent Vehicles Symposium (IV); Jun. 23-26, 2013; 6 pgs.

Alberto Y. Hata, et al.; "Feature Detection for Vehicle Localization in Urban Environments Using a Multilayer LIDAR";IEEE Transactions on Intelligent Transportation Systems, vol. 17, No. 2; Feb. 2016; 10 pgs.

Miachel Thuy, et al.; "Lane Detection and Tracking Based on Lidar Data"; Metrology and Measurement Systems—Metrol. Meas. Syst., vol. XVII (2010), No. 3, 11 pgs.

Sören Kammel; et al.; "LIDAR-based Lane Marker Detection and Mapping"; 2008 IEEE Intelligent Vehicles Symposium; Jun. 4-6, 2008; 6 pgs.

Applicant: Case Western Reserve University; "Systems and Methods to Apply Markings"; European Patent Application No. 18850421; Extended European Search Report; dated Mar. 31, 2021; 7 pgs.

Jorgen Svensson, et al.; "Road Marking Equipment—Marking and Maintenance Equipment"; https://rme.se/; (video: https://www.youtube.com/watch?v=jlkG82PGW2E); Aug. 19, 2020; 14 pgs.

Svenska; "Intelligent Machines—Road Marking Robot"; http://intmach.com/starteng/projects/road%20marking%20robot.html; Aug. 19, 2020; 2 pgs.

Video: https://www.youtube.com/watch?v=jlkG82PGW23.

Jesse Levinson, et al.; "Robust Vehicle Localization in Urban Environments Using Probalistic Maps"; 2010 IEEE International Conference on Robotics and Automation Anchorage Convention District; May 3-8, 2010; 7 pgs.

\* cited by examiner

SYSTEMS AND METHODS TO APPLY MARKINGS

CROSS-REFERENCE TO RELATED APPLICATIONS

This application is a continuation-in-part of International application no. PCT/US2018/49118, filed 31 Aug. 2018, which claims priority from U.S. provisional application No. 62/552,924, filed 31 Aug. 2017 and claims priority from U.S. provisional application No. 62/567,621, filed 3 Oct. 2017. Each of the above-identified applications is fully incorporated herein by reference.

TECHNICAL FIELD

This disclosure relates generally to systems and methods to apply markings to a surface.

BACKGROUND

Vast sums of money are spent in the U.S. and throughout the world to apply road markings on various road surfaces. In some examples, such as for longitudinally extending straight and curved lines along the roadway, machines may be used to apply corresponding road markings. In other examples, where more complex shapes and lines are needed, road markings are often applied by hand using stencils. The associated costs with applying such markings are largely dependent upon the personnel required to apply painting as well as to direct traffic near the location where the markings are being applied. Additionally, because stencils are hand painted, workers may be exposing themselves to potential injury from collisions with vehicles or work vans.

To address these and other issues, some automated systems have been developed. It seems that for many applications, however, such automated systems fail to provide practical solutions. For example, there may be intermittent or sustained issues associated with accurately localizing where to apply a given marking. Additionally or alternatively, the approaches may seem too complicated to use by planning and/or field personnel.

SUMMARY

In one example, a method includes storing marking data to specify at least one selected marking to apply at a target location along a vehicle path of travel, the marking data including a machine-readable description and a marking reference coordinate frame for the selected marking. The method also includes generating task plan data to apply the selected marking based on the marking data and at least one parameter of an application tool. The method also includes determining a location and orientation of the application tool with respect to the vehicle path of travel based on location data representing a current location of a vehicle carrying the application tool. The method also includes computing a joint-space trajectory to enable the application tool to apply the selected marking at the target location based on the task plan data and the determined location of the application tool.

In another example, a system may apply markings to a surface. The system includes at least one sensor to provide location data representing a current pose of a vehicle carrying an application tool along a vehicle path of travel. One or more non-transitory machine-readable media can store instructions, marking data and task plan data. The marking data describes at least one selected marking to apply at a target location, including a marking reference frame for the selected marking. The task plan data describes a process of applying the selected marking based on at least one parameter of the application tool. A processor may execute the instructions to at least: determine a pose of the application tool along the vehicle path of travel based on the location data, and compute a joint-space trajectory to enable the application tool to apply the selected marking at the target location based on the task plan data and the pose of the application tool. A tool controller is configured to control the application tool to apply the selected marking at the target location based on the joint-space trajectory.

In yet another example, a method includes storing marking data to specify at least one marking that an application tool, which is carried by a vehicle, is to apply at a target location along an application path of travel for the vehicle. The method also includes receiving geospatial coordinate data from a global positioning system device to represent a current pose of the vehicle along the application path of travel. The method also includes sensing fiducials by at least one other sensor along the application path of travel. The method also includes determining fiducial data representing a fiducial coordinate frame for each of the sensed fiducials along the application path of travel with respect to a reference coordinate frame. The method also includes computing a transformation to correlate the fiducial coordinate frame for each of the sensed fiducials along the application path of travel to a spatial coordinate frame for respective fiducials sensed along a previous survey path of travel. The application path of travel is to approximate the survey path of travel. The method also includes determining a pose of the application tool along the application path of travel based on the transformation and the geospatial coordinate data.

As yet another example, a system may apply markings to a surface. The system includes a global positioning system device to provide geospatial coordinate data representing a current pose of a vehicle carrying an application tool along an application path of travel. At least one other sensor is provided to sense fiducials along the application path of travel. One or more non-transitory machine-readable media store instructions and marking data. The marking data describes at least one selected marking that the application tool is to apply at a target location, including a marking reference frame for the selected marking. A processor is provided to execute the instructions to at least: determine a spatial coordinate frame for the fiducials sensed by the at least one other sensor along the application path of travel. The processor further is to compute a transformation to correlate the spatial coordinate frame for each of the sensed fiducials along the application path of travel to the spatial coordinate frame determined for respective fiducials sensed along a previous survey path of travel, the application path of travel to approximate the survey path of travel. The processor further is to determine a pose of the application tool along the application path of travel based on the transformation and the geospatial coordinate data.

DETAILED DESCRIPTION

Figure 1:
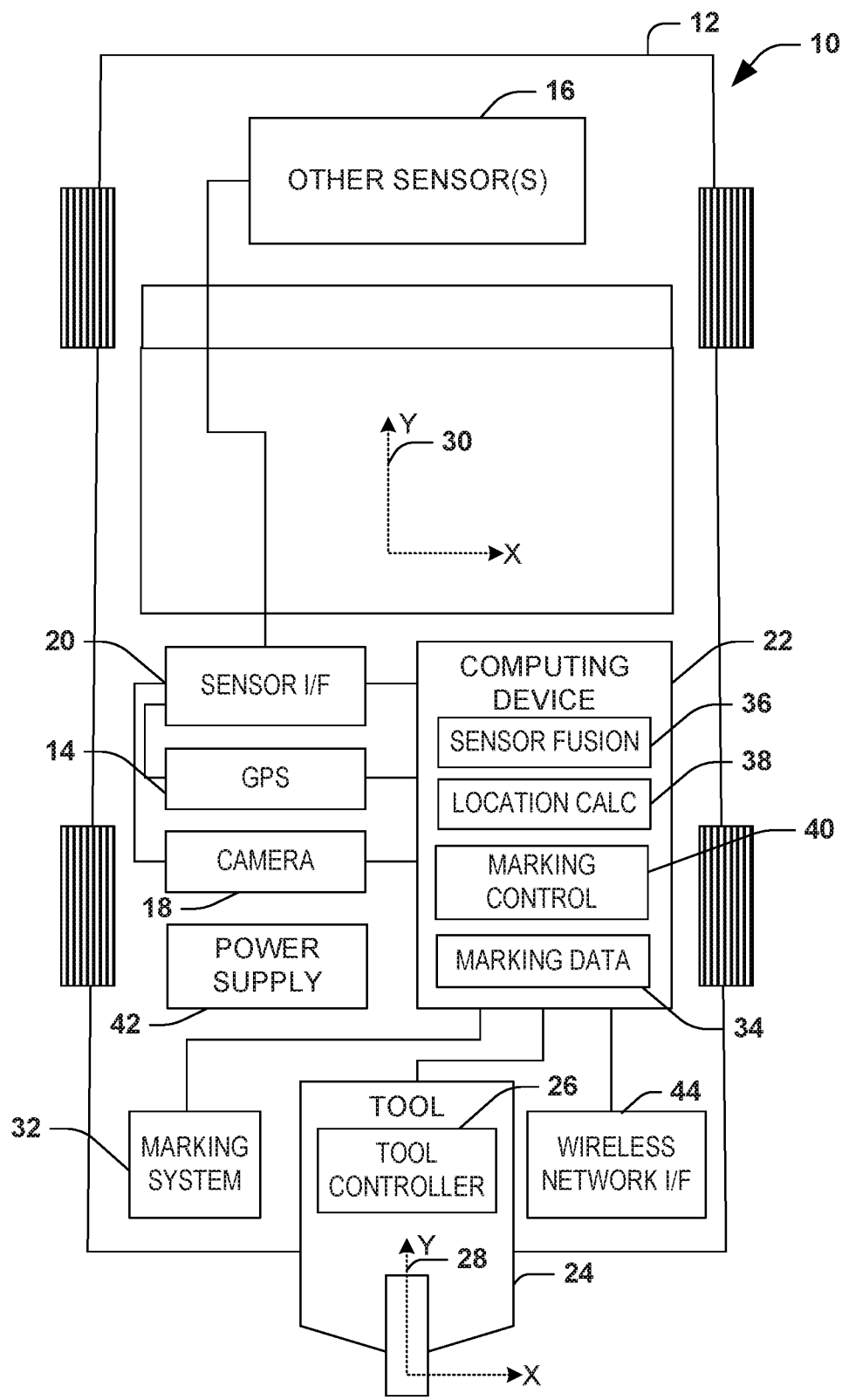
FIG. 1 depicts an example of a vehicle carrying a system to apply markings along path of travel.

This disclosure relates to systems and methods to apply markings to a surface, such as a road or other structure (e.g., bridge, sign, parking lot, and the like), that may reside on or near a path of travel of a vehicle. As an example, an application tool is carried by a vehicle that can be guided to a start location for applying a given marking at a target location along the vehicle path of travel. As used herein, an "application tool" may refer to a controllable system (e.g., robot), a dispensing tool (e.g., painthead) or to both the controllable system and dispensing tool. Attributes of the given marking can be defined by marking data that may be configured in advance of applying the marking. As used herein, the marking may include adding a graphical object (e.g., one or more symbols, words, lines or a combination thereof), removing or changing the surface (e.g., cleaning, sealing or coating, cutting and/or milling) and the like. For example, a user can utilize a planning system, operating on a computing device, which includes a graphical user interface (GUI) to select one or more markings and assign the selected marking to a target location. This can be done in an office or the on-site by a traffic engineer, highway engineer, city planner or the like using simple drag and drop operations afforded by the GUI (e.g., a CAD-style interface). For example, a user can employ the GUI to drag and drop any standard or customized road marking and position it at a desired location along the vehicle path of travel to create a precise project map that can be stored in computer readable memory as the marking data. In an example, the marking data can include machine-readable description of the marking, a reference coordinate frame for the selected marking and a position and orientation of marking that has been selected in response to the user input. Attributes (e.g., size and materials) may be automatically scaled and programmatically linked with the marking data according to the target location where the marking is to be applied.

To facilitate precision localization of the marking, the vehicle carrying the application tool is configured with an arrangement of sensors. In advance of applying the markings, the vehicle can traverse a survey path of travel where one or more markings are to be applied and produce a map of the roadway that is stored as survey data. The survey data may include geospatial coordinates for the path of travel as well as relative localization for fiducials that are distributed along the path of travel (e.g., a roadway or other surface). Such fiducials may include any fixed object or key landmarks, such as trees, signs, fire hydrants, drain covers, curves, existing road markings (e.g., full or partial markings) or other objects having a fixed pose (e.g., position and orientation) with respect to the path of travel. The survey data may be visualized with the GUI provided by the planning system.

As a further example, a corresponding task plan can be generated to define a process for applying the selected marking using a given application tool, though independent of a target location. For example, the task plan is generated based on the marking data (independent of the target location) and one or more parameters of the application tool (e.g., paint head configuration, distance to target and spray nozzle) to apply the selected marking at a zero reference frame. With the marking data and the task plan stored in memory, the vehicle carrying the application tool can then be advanced along an application path of travel (e.g., corresponding to the same path as the survey path of travel). Once the vehicle arrives at or near the target location, such that the application tool is able to reach the target location, the vehicle can be stopped or slowed down. In some examples, guidance may be provided to the operator to stop the vehicle based on global positioning system (GPS) data and/or other sensor data. For example, a computing device is programmed to determine a current pose (position and orientation) of the application tool based on location data that is derived from one or more sensors mounted at fixed known locations with respect to the vehicle, as disclosed herein.

After confirming that the target location is within reachability of the application tool, a joint space trajectory is computed to enable the application tool to apply the selected marking at the target location. The joint-space trajectory may be computed based on the task planning data and the pose of the application tool, as disclosed herein. In response to detecting changes in sensor data that affect the location and/or orientation of the vehicle, the joint-space trajectory may be recomputed to provide an adaptive process to account for such detected changes (e.g., in the vehicle pose, or shift its topography).

In some examples, one of the sensors includes a camera that can acquire an image of a surface containing the target location and superimpose a graphical representation of the selected marking at the target location (e.g., rendered as part of an interactive GUI) based on the determined pose of the application tool. The operator can view the superimposition of the selected marking on a display device at the target location to confirm or reject applying the marking at the target location. For example, the GUI is programmed to allow the operator to adjust the position and/or orientation of the marking with respect to the target location. Alternatively, the user may move the vehicle to modify the pose of the vehicle and associated application tool, which movement will be reflected in precision localization and displayed in the GUI. After confirming that the target location for the selected marking is satisfactory, the operator can trigger the application of the selected marking (e.g., in response to a user input). In response, a corresponding joint space trajectory can be computed to control the tool to apply the marking at the target location (e.g., the original or modified target location). The vehicle may be stationary or moving during application of the marking at the target location. The marking may be a new marking applied at a target location having a clean (e.g., unmarked) surface or be applied to the target location to overpaint an existing marking.

In an additional or alternative example, the GUI is programmed to allow the operator to select a different (new) marking to apply at the target location and/or to apply the selected marking (the originally selected or different marking) at an updated target location. In response to such user selection with the GUI, marking data including a marking identifier and pose of the marking (geospatial coordinates and heading) are stored in memory. The marking identifier may specify a type, name, description and/or other information to identify the marking. The marking may be applied at updated target location based on a corresponding computed joint space trajectory in response to a user input instruction to activate application or, if for some reason (e.g., temperature, moisture, and/or surface conditions otherwise unsuitable) the application is to be deferred to later time, the stored day may be used to apply the marking at a later time as well as to enable a subsequent reapplication at the precise geospatial coordinates based on the stored marking data. Or in another example, the application may be deferred for other reasons, such as when the user is not authorized to apply the marking without approval from a supervisor. Such approval may be made later (e.g., upon returning) or, in some examples, a message can be sent (in real time) with the marking data and image data to request immediate approval to apply the new marking. Upon receipt, an authorized person may provide such approval via the same or different messaging technology to enable application while the vehicle is in the field. Additionally, by storing this marking data and other marking data (acquired for existing markings during a survey) a detailed geospatial database of road markings and other fiducials may be constructed, such as for use by autonomous or connected vehicles.

As a further example, systems and methods disclosed herein can utilize sensor fusion to integrate sensor data acquired by multiple sensor modalities. Examples of sensor modalities may include global positioning system (GPS) sensors, LIDAR sensors, camera, precision odometry sensor, speed sensors, sonar systems, steering angle sensor, ground penetrating radar sensor, a gyroscope sensor and inertial measurements (from inertial sensors), and the like. The sensor fusion can aggregate data received from the plurality of sensors to localize the spatial coordinates and orientation of the vehicle to a higher degree of precision than many existing systems. Moreover, the pose of the application tool is readily determined from the vehicle pose since a reference coordinate frame of the tool has a predefined pose with respect to a reference frame of the vehicle. In an example, uncertainty associated with one or more sensors may be updated in real time and used to weight the sensor values utilized by the sensor fusion accordingly. In an example, the sensor fusion may, based on determining that one or more sensors have a high degree of confidence, select such one or more high-confidence sensors to localize the pose of the vehicle while disregarding the data from the other sensors having higher uncertainty (lower confidence). Thus, in some examples, data from a single high-confidence sensor may be used in some circumstances; whereas, in other examples, data from multiple sensors may be used.

The systems and methods disclosed herein thus can achieve accurate application of markings to the road or other surface of interest. Additionally, since the application of markings is implemented by a robot the graphical details and materials used can be expanded beyond those currently being applied by human operators. For example, by automating the task of applying markings enables more eye-catching and more artistic markings, such as may include encodings for autonomous vehicles, ability to paint sponsor logos, and affordability of adding more bicycle lanes and sharing symbols. Moreover, the approach is adaptive to on-the-fly changes that may occur at the target location between the planning phase and the application phase without requiring replanning or reprogramming of the application process. As a result, markings may be applied more with higher precision, more cost effectively and more safely.

FIG. 1 depicts an example of a system 10 to apply markings to one or more target locations. The system 10 is demonstrated in FIG. 1 as being integrated into a vehicle 12. The vehicle 12 can be a truck or other vehicle that can traverse the roadway or other surface along which one or more target locations can be identified for applying respective markings. The vehicle 12 may be an autonomous vehicle and/or manually driven vehicle. As disclosed herein, the system 10 is configured to perform precision localization of the vehicle 12 such as to ascertain the position and orientation (i.e., pose) of a vehicle reference coordinate system to within a predetermined accuracy (e.g., less than one inch, such as to within 1 cm or less). The system 10 can include a GPS device (e.g., a GPS receiver) 14 to provide geospatial coordinates for a reference frame of the vehicle. In some examples, the GPS device 14 may provide centimeter precision for the vehicle 12 provided that the sensing antenna remains unobstructed by trees, bridges or other objects (e.g., tall buildings) that can interfere with the GPS accuracy.

The system 10 includes one or more other sensors 16 that may be utilized to sense fiducials along the vehicle's path of travel to enable precision localization. Such fiducials can be any fixed object along the vehicle's path of travel that can be sensed by the sensors 16. For example, fiducials may include existing road markings, trees, telephone poles, fire hydrants, mail boxes, signs, curbs, manhole covers, water-main accesses, gas-line markings, buried cable markings, curbs, grates, speed bumps or the like. Different types of sensors may be utilized to detect different types of fiducials that may be distributed along the path of travel or fiducials associated with the vehicle that vary as a function of vehicle motion. Examples of such other sensors 16 include LIDAR, radar, ground penetrating radar, sonar, ultrasonic sensors, wheel encoders, accelerometers, odometry sensors, wheel angle sensors, color camera as well as other sensing modalities that can detect such features that may be detectable along the path of travel. Explicitly shown in the example of FIG. 1, is a camera 18 (e.g., one or more digital color cameras). The camera 18 thus operates to acquire images (e.g., digital color images at a corresponding frame rate) along the path of travel of the vehicle 12. There can be one or more such cameras 18 provided on the vehicle 12, such as may be arranged to acquire images below the vehicle, laterally to the vehicle from the passenger and/or driver side, from the front and/or rear of the vehicle. In an example, the camera 18 includes a ground-facing camera adjacent an application tool 24 and configured with a field of view that includes a zone of reachability for the application tool.

The system 12 can include a sensor interface 20 that can perform initial sensor processing (e.g., filtering, analog-to-digital conversion, and the like) to provide an aggregate sensor data to a computing device 22. In some examples, the sensor interface may be integrated into the computing device 22. The computing device 22 is configured to process the sensor data, including from the GPS 14, camera 18 as well as other sensors 16. The computing device is also configured to provide instructions to control the application tool 24. For example, a tool controller 26 can be connected with the computing device 22 via a connection (e.g., physical or wireless connection) and the computing device can provide commands (e.g., in the form of a joint-space trajectory) to the controller 26 that are utilized to apply each selected marking at respective target locations. For example, the application tool 24 is implemented as a robot. As one example, the robot 24 is an industrial robot, such as a painting robot, that is commercially available from Yaskawa America, Inc. of Miamisburg, Ohio. Additionally or alternatively, other types of application tools may be used in other examples, such as may vary depending on the type of markings to be applied. While the example system 10 in FIG. 1 is demonstrated as including a single application tool 24, in other examples, more than one application tool (e.g., a plurality of robots) may be implemented on the vehicle 12 for performing different marking functions, including performing multiple marking functions concurrently.

The computing device 22 can be implemented as a portable device that can be carried on a vehicle 12. The computing device 12, for example can include one or more non transitory machine-readable media to store executable instructions and related data. The computing device 22 can also include one or more processors for executing the instructions and computing information to enable command instructions to be provided to the controller 26. The example application tool 24 includes a tool reference frame 28 such as providing two-dimensional coordinate system having an origin at a fixed location with respect to the tool 24. The origin and coordinate system 28 also has a predefined location and orientation with respect to a vehicle reference frame 30. Each of the sensors 14, 16 and 18 can be calibrated to provide sensor information with respect to the vehicle reference frame 30. For example, the computing device 22 can compute corresponding transformations for each sensor such that the sensor information is spatially registered with respect to the vehicle reference frame 30.

In some examples, the system 10 also includes a marking system 32 that can supply materials or other features to the application tool 24 for applying the marking at the target location. For example, the marking system 32 can include one or more volumes of paint or other coating materials that can be fluidly connected with the application tool 24, such that upon activation of the tool, a controlled amount of marking material is applied to the target location. Additionally, or alternatively, the marking system 32 may include sensors (e.g., a sonar or ultrasonic sensor) and signal processing to determine and control a distance between an applicator of the tool and the surface (e.g., road). The marking system 32 thus may provide sensor signal or other information utilized by the controller 26 to maintain a desired distance during application of each selected marking.

As mentioned, the computing device 22 is programmed to execute instructions for performing various functions associated with determining location and programming the tool 24. The computing device includes marking data 34 that can be pre-computed for each selected marking that is to be applied. For example, the marking data 34 specifies a type of marking that has been selected, size (or scaling of the selected marking) as well as spatial coordinates of a marking reference frame for the target location to which the selected marking is to be applied. Other data associated with application of the marking can also be stored as part of marking data 34. Such other marking data 34 can include, for example task plan data, describing a process for the application tool to create the selected marking as a function of the marking reference frame and one or more tool parameters implemented by the tool 24 and associated controller 26 to apply the marking. As disclosed herein, the target location can correspond to spatial coordinates of a marking reference frame that has been determined based on location data derived from sensor data (e.g., from the GPS 14, camera 18 and/or other sensors 16).

In an example, the sensor data corresponds to fused sensor data generated by a sensor fusion function 36. The sensor fusion function 36 is programmed (e.g., machine-readable instructions) to receive sensor data from the GPS sensor 14 and from one or more other sensors 16 and/or 18 as the vehicle 12 is along the path of travel. As used herein, the path of travel may refer to a survey path of travel which corresponds to the path of travel and trajectory of the vehicle 12 as it maps out the locations to which one or more markings will be applied. The path of travel may also correspond to an application path of travel which is the pose of the vehicle 12 as it moves along the path for applying the marking at each respective target location defined by the marking data 34. The sensor fusion function 36 thus is programmed to fuse the sensor data from sensors 16 and/or 18 with the geospatial data from the GPS to provide corresponding fused location data representing a precise (e.g., within about 1 cm) current location of the vehicle 12. In examples where sensor fusion 36 is enabled, the fusion function 36 is programmed to further determine an uncertainty associated with a measure of location accuracy for each of the geospatial data (e.g., from GPS sensor 14) as well as each other sensor data (e.g., from sensors 16 and/or 18). A weight value can be assigned to each of the geospatial data and sensor data that are acquired to provide weighted data. As an example, the weighting may be implemented by an extended Kalman filter that implements weighting to the sensors 14, 16 and 18 that is inversely proportional to the sensing modality measurement uncertainty that is determined for each respective sensor. The weighting further may vary over time as the uncertainty may vary during the sensing process. For example, the measurement uncertainty (e.g., error) of the GPS sensor 14 may increase if the GPS sensing is obstructed such as by buildings, trees, bridges, and the like. The sensor fusion function 36 further may aggregate each of the weighted sensor data that is acquired to provide the corresponding fused location data. In this way, the position and orientation of the vehicle 12 and, in turn, the application tool 24 can be determined as a function of the fused sensor data.

A location calculator function 38 can be programmed to implement respective transformations to transform corresponding sensor data from each of the sensors 14, 16 and 18 into a common coordinate reference frame to facilitate precision localization. As an example, the computing device 22 is programmed with a transformation for each sensor 14, 16 and 18 that is calibrated with respect to the vehicle reference frame 30. The transformation thus can be utilized to compute a spatial transformation for fiducials detected by each of the sensors 16 and 18 into the reference frame 30 of the vehicle 12 and the location calculator can utilize the transformed spatial coordinates from such sensors to compute an indication of vehicle pose and/or vehicle motion. As a result, by aggregating location information among the respective sets of sensors 14, 16 and 18, the location calculator 38 can provide a precision estimate of vehicle pose. Moreover, the sensor fusion function 36 can utilize the transformed sensor data for providing the fused sensor data, which may be utilized by the location calculator. As mentioned, the precision localization of the vehicle reference frame 30 can be further translated to the reference frame 28 of the application tool (based on the known spatial geometry between reference frames 28 and 30) over the vehicle path of travel.

The computing device 22 also includes a marking control function 40. The marking control function 40 can include a joint-space trajectory calculator (see, e.g., FIG. 8) programmed to compute a joint-space trajectory to enable application tool 24 to apply each selected marking at the target location. The marking control function 40 computes the joint-space trajectory based on the marking data 34 (e.g., the task plan that has been determined for the selective marking) and the determined pose of the application tool 24 (e.g., the current pose of tool reference coordinate frame 28). In some examples, the task plan may include multiple sub-process plans associated with the application of a given marking that may involve more than one application tool. As an example, one sub-process plan may be to apply thermoplastic marking materials and another may be to apply heat in order to achieve suitable thermoset bonding to the underlying surface. As another example, one sub-process plan may apply heat to the surface to be coated, and a next sub-process plan to apply a marking material such as paint to the heated surface. The computed joint-space trajectory thus may likewise include multiple joint-space trajectories for operating at the target location according to the multiple sub-process plans associated with the application of each respective marking. The marking control function 40 provides the computed joint-space trajectory to the tool controller 26, which controls one or more actuators of the tool 24 to apply the marking at the target location. The marking control 40 can also control changes to the marking data 34 and/or respond to user input instructions entered by an operator to control operation of the tool 24.

In some examples, a marking zone can be determined for the application tool 24 and utilized (e.g., by the marking control 40) to control the tool 24. The marking zone defines a spatial region (or volume) of reachability for the application tool 24. When the target location for a selected marking is located within the marking zone of the tool, the tool 24 has sufficient reachability to apply at least a substantial portion of the selected marking at the target location. The substantial portion of the selected marking can be determined based on the overall size of the marking relative to the known reachability of the application tool. For example, if a given marking is larger than the zone of reachability for the application tool, the given marking may be divided into multiple marking portions. The vehicle can be moved to a first marking zone to apply one portion and after that has been completed the vehicle may be moved to a second location to apply the next marking portion, and so forth until the entire marking has been applied. For a given marking or portion thereof, the marking control 40 can be programmed to determine whether the vehicle location and orientation is within the marking zone. The marking control 40 may further generate guidance to inform a user whether or not the vehicle is in the marking zone. The guidance may be in the form of an audible and/or visual alert.

As a further example, after the vehicle is stopped at or near a start location along the path of travel, the computing device 22 can generate a graphical representation of the selected marking that is superimposed onto a current camera image that has been acquired (e.g., by a ground facing camera 18) to include the target location. For example, the superimposed image may be visualized on a display within the vehicle passenger compartment. In this way, the display is provided a visualization of the target marking that has been scaled and graphically rendered at the target location (based on localization data determined by the location calculator 38). This affords the user an opportunity to decide whether or not to actually apply the marking with the current orientation at such target location or if the target location and/or orientation should be adjusted.

For example, an adjustment to the target location may include translation and/or rotation of the selected marking with respect to the target location in response to a user input, which provides a modified target location. If the target location and/or orientation are modified, the marking control 40 may compute or recompute the joint space trajectory for the selected marking according to the modified target location. If the target location is not adjusted in response to a user input, the user can instruct the computing device 20 to proceed with applying the selected marking at the original target location. In response to such user input, the marking control 40 can compute the joint-space trajectory (if not already computed) based on the task plan and the current determined pose of the application tool reference frame 28. The controller 26 thus employs the joint-space trajectory that has been computed to apply the selected marking at the target location (e.g., the original or modified target location). This process will be repeated for any number of selected markings along the vehicle path of travel based on the marking data 34.

In some examples, such as where a given marking extends beyond the reachability for a single pass by a stationary vehicle, the vehicle may be controlled (e.g., automatically and/or manually by the user) to move along the path of travel. In this example, the location data will update according to a sample rate that sensor data is acquired (e.g., by sensors 14, 16 and/or 18) along the path of travel. The updated location data can be applied to recompute the joint-space trajectory provided that the target location is within the zone of reachability for the application tool 24. For example, marking control 40 intermittently recomputes a joint-space trajectory at each of the spaced apart locations along the path of travel, which can be provided to the controller 26 to control the application tool 24 to apply the marking as the vehicle moves along the path of travel. Additionally, corresponding guidance may be provided continually as the vehicle moves along the path of travel to inform the user whether or not the application tool remains within a zone of reachability for applying the selected marking. In some situations, the vehicle 12 may advance along the path of travel and stop for application of the selected marking (or a portion thereof). In other examples, the vehicle may continue to move along the path of travel (at a fixed or variable speed) during application of the selected marking.

By way of example, sensors 16 and/or 18 can be configured to sense fiducials as the vehicle moves along a survey path of travel. Fiducials may be automatically or manually selected based on survey data acquired during a previous mapping run with the vehicle. For instance, the mapping run may involve driving the vehicle 12 along the survey path of travel, which is the same path to which the markings are to be applied. As the vehicle moves along such path of travel, the camera 18 and other sensors 16 can detect fiducials along the survey path of travel. Fiducials can be identified along the survey path of travel automatically or in response to user input selecting fiducials in a GUI during or after the mapping run has been completed. The location calculator 38 can analyze each fiducial in a set of identified fiducials to determine a location information describing a fiducial coordinate frame for each fiducial, such as may be localized with respect to the vehicle reference frame 30.

By way of further example, during the application phase, fiducials may be sensed by sensors 16 and/or 18 as the vehicle 12 moves along the application path of travel. For example, fiducials may be recognized near expected fiducial locations specified in the survey data. Location calculator 38 determines a corresponding spatial coordinate frame for each fiducial that is identified along the path of travel. The location calculator can compute a corresponding transformation to correlate the spatial coordinate frame for each of the sensed fiducials along the application path of travel with respect to the spatial coordinate frame of the same fiducials previously identified along the survey path of travel. Such transformation thus can be utilized to ensure that the location data representing the pose of the vehicle reference frame 30 and tool reference frame 28 is determined to a sufficiently high degree of accuracy as it is based on combination of absolute geospatial data (from GPS 14) and relative localization (from camera 16 and other sensors 16).

In the example of FIG. 1, the system 10 includes a power supply 42 configured to supply electrical power to the various components of the system. For example, the power supply can include a generator or other source of electrical power (e.g., an inverter, on-board vehicle power supply or the like). The system may also include a wireless network interface 44 to enable communication with a remote device or server (e.g., for monitoring or reporting data acquired during mapping or application phases). For example, the wireless network interface 44 can be implemented to communicate digital data via a wireless communications link, such as a Wi-Fi and/or cellular data link.

Figure 2:
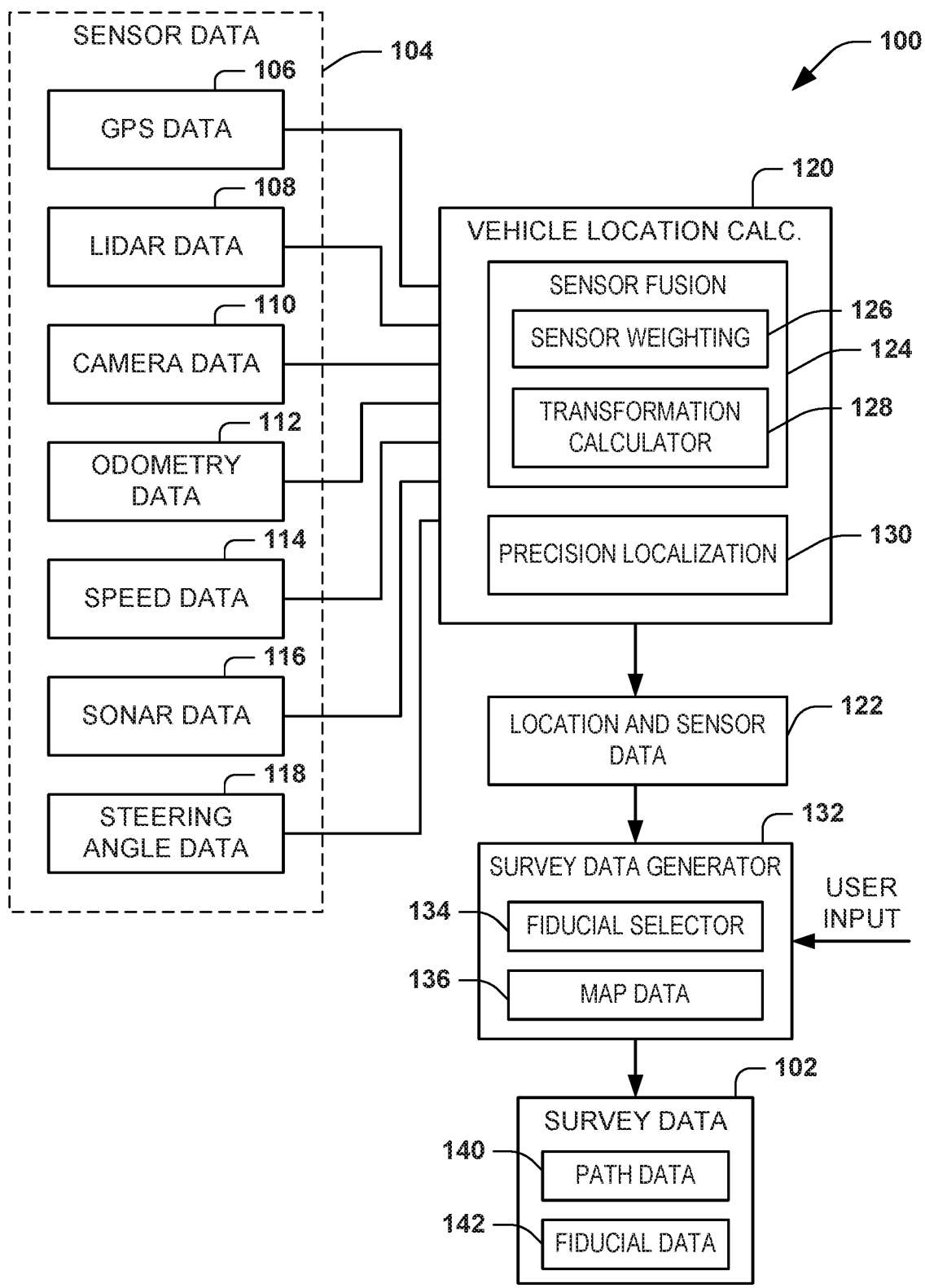
FIG. 2 depicts an example of a surveying system to provide survey data associated with an area where road markings are to be applied.

As a further example, FIG. 2 depicts an example of a system to generate a survey data 102 that represents a path of travel that has been mapped out as a prospective recipient of one or more markings that are being applied. The system 100 utilizes data from one or more sensors that can be mounted in a fixed position with respect to a vehicle (e.g., sensors 14, 16 and 18 of FIG. 1) to provide corresponding sensor data 104. In this example, it is presumed that the data 104 has been acquired and stored in memory (e.g., one or more non-transitory machine-readable media). For example, the data can be transferred from local storage on the vehicle to another computing device (e.g., via wireless network interface 44 or another mechanism, such as a removable storage medium). In another example, the same computing device (e.g., device 22—a laptop or other portable computer) can be used to acquire and store the data 104 on the vehicle as well as implement the system 100.

In this example, the sensor data includes GPS data 106, LIDAR data 108, camera data (e.g., image data) 110, odometry data 112, speed data 114, sonar data 116, and steering angle data 118. It is understood that the sensor data 104 can use various combinations of the data shown in FIG. 2 to provide sufficiently precise location related information to generate the survey data 102. The data 104 further may be pre-processed and/or otherwise associated with other data, such as synchronized according to a time stamp. Thus, the data 104 can represent various attributes of a vehicle and/or surrounding environment along the path of travel.

The system 100 includes a vehicle location calculator 120 that is programmed to produce location data based on analysis of the sensor data 104. As used herein, the location data can represent the pose of the vehicle along one or more paths of travel. The location calculator 120 thus can produce the location and sensor data 122 corresponding to the pose of a vehicle reference frame (e.g., reference frame 30 of FIG. 1). Some or all of the sensor data 104 may also be included with the location and sensor data 122. As described herein, such sensor data can be transformed into the coordinate frame of the vehicle to facilitate sensor fusion 124 and localization 130 in a common reference frame.

To increase localization accuracy based on the sensor data 104 that has been obtained from multiple sensor modalities, location calculator 120 includes a sensor fusion function 124. Sensor fusion function 124 is programmed to determine an indication of accuracy of each of the sensor data, which accuracy may vary over time. For example, in some situations GPS data 106 may provide precision approaching about one centimeter provided the sensor has a clear unobstructed view of the sky containing the GPS satellites. However, in certain situations, such as in tree covered areas and in highly dense urban areas with tall buildings, bridges and/or other structures, the precision of the GPS data 106 may become less precise. Sensor fusion function 124 thus utilizes sensor weighting function 126 to selectively weight sensor data according to the determined uncertainty associated with each unit of sensor data 104 to facilitate accurate localization of the vehicle. For example, sensor weighting function 126 may be implemented as a Kalman filter configured to determine uncertainty and apply weighting coefficients to control the impact provided sample of the data 106-118, respectively. In this way, the sensor fusion 124 can increase the relative influence of sampled sensor data that is determined to have a greater amount of certainty on the location calculation by calculator 120 for each sample time instance, while reducing the influence of more uncertain data. As one example, sensor fusion 124 implements sensor weighting function 126 so that GPS data 106 is utilized when precision is determined to be sufficiently high, but utilizes one or more other sensor data 108-118 (e.g., precision odometry data 112, LIDAR data 108, camera data 110 and/or other sensors, such as inertial sensors data, gyroscope data and ground penetrating radar data), which are determined to be sufficiently high accuracy, to compute changes in vehicle pose (e.g., motion) with respect to the high precision GPS updates when available along the path of travel.

In an example, the sensor fusion function 124 evaluates the weighting values (representing uncertainty of sensor measurements), to identify a set of sensors having a low degree of uncertainty (e.g., below an uncertainty threshold individually or collectively. Alternatively, sensor fusion can determine sensors having a high degree of confidence (e.g., above a defined confidence threshold). The sensor fusion function 124 thus can select such one or more high-confidence sensors to use for localizing the pose of the vehicle and/or application tool, while discarding data from the other sensors determined to have greater degree of uncertainty (lower confidence). Consequently, in some examples, sensor fusion function 124 can generate fused location data from a single high-confidence sensor and, in other examples, data from multiple sensors may be used. The number of sensors used over the path of travel thus may vary according to changes in the uncertainty associated with each of the sensors.

Sensor fusion function 124 can also include a transformation calculator 128. The transformation calculator 128 is configured to translate sensor data from a sensor reference frame into vehicle reference frame along the path of travel. That is the reference frame of each sensor is known a prior with respect to the vehicle reference frame. Accordingly, the transformation calculator is programmed with transformations to reconcile the relative measurements provided in each sensor data 108-118 with corresponding absolute coordinates associated with the vehicle reference frame, which may be derived from the GPS data 106 and/or from the results of previous calculations.

By way of example, LIDAR data 108 includes range and azimuth data (polar coordinates). Since the reference frame of the LIDAR sensor is known relative to a reference frame of the vehicle, the transformation calculator 128 is programmed to apply a coordinate transformation to convert the polar LIDAR data 108 to corresponding Cartesian coordinate data. The LIDAR data can be analyzed (manually and/or automatically) to identify fiducials along the path of travel, which may be identified as a step change from large radii (no objects returning a signal within range of the LIDAR) to distinctly smaller radii (e.g., a telephone pole reflecting a LIDAR ping). By scanning the LIDAR data for such discontinuities (equivalently, gradients), a set of fiducials and their relative location along the path of travel can be determined. For example, the transformation calculator can compute the pose of the LIDAR sensor that would reconcile the relative measurements (LIDAR-based features) with the corresponding absolute coordinates:

$$T\_feature/world = T\_sensor/world * T\_feature/sensor$$

where T is a 4×4 coordinate transformation,
  T_feature/world is a pre-mapped set of coordinates of the identified feature with respect to the world (e.g., high-precision latitude and longitude), and
  T_feature/sensor represents the coordinates of the recognized feature with respect to the LIDAR sensor (converting polar coordinates to Cartesian coordinates).

Therefore knowing T_feature/world and T_feature/sensor allows computation of T_sensor/world, which can represent a high-precision latitude and longitude of the LIDAR sensor. With the sensor calibrated with respect to the vehicle, this calibration can be expressed as T_sensor/vehicle, i.e. the pose of the sensor with respect to a reference frame associated with the vehicle. It follows that:

$$T\_sensor/world = T\_vehicle/world * T\_sensor/vehicle$$

Therefore, knowing T_sensor/world and T_sensor/vehicle, the transformation calculator can compute T_vehicle/world, which corresponds to the absolute (geospatial) coordinates of the vehicle reference frame.

The above example for the LIDAR data 108 can be extended and modified to provide corresponding transformations for the other sensor data 110-118. For example, the camera data 110 can acquire images of the road, verge areas adjacent to the road, as well fiducials within the field of view. As with the LIDAR sensor, the transformation calculator 128 is programmed to correlate a reference coordinate frame of the camera to the vehicle's reference frame. Through this transform, fiducials in camera coordinates can be converted to fiducials in the vehicle coordinate frame.

For the example where the sensor data includes LIDAR data 108, camera data 110 and odometry data 112, the transformation calculator performs three different computations for T_vehicle/world: one from GPS+odometry, one from LIDAR and one from vision. Different numbers and types of computations would be used for different combinations of sensors. As mentioned, since each of these modalities has an associated uncertainty, respective sensor weighting 126 is applied to each transformed sensor data to provide the fused location data. The sensor fusion function 126 thus can combine the transformed sensor data algebraically based on weightings that are proportional to credibility. For example, a location vector, L, includes estimates from GPS/odometry (L_gps), from LIDAR (L_lidar), and from camera (L_image). In an example, the fusion function 124 thus may combine the location estimates as:

$$L\_fused = a * L\_gps + b * L\_lidar + c * L\_image,$$

where a+b+c=1, and a, b and c are weighting values inversely proportional to the modality measurement uncertainty.

Vehicle location calculator 120 also includes a precision localization function 130 that is programmed to determine vehicle location data representing the pose of a reference coordinate frame of the vehicle based upon the sensor fusion 124. Location data 122 thus provides an indication of the vehicle pose along the path of travel of the vehicle during the mapping phase. Corresponding sensor data can also be stored in conjunction with the location data along the path of travel to facilitate generation of the survey data 102. For example, such sensor data can include raw sensor data or processed sensor data that is been transformed (by transformation calculator 128) into the reference frame of the vehicle along the path of travel, as described above.

A survey data generator 132 is programmed to generate the survey data 102 based on location data and sensor data 122. For example, the survey data generator 132 includes a fiducial selector 134 that is programmed to select one or more fiducials along the vehicle path of travel based on sensor data (e.g., sensor data 108-118) from one more sensors. As mentioned, fiducials can correspond to existing road markings, landmarks or other stationary objects that can provide an additional frame of reference to enable precision localization of the vehicle during an application phase when one or more markings are to be applied. The fiducial selector 134 thus can identify one or more fiducials based on the sensor data detected along the vehicle's path of travel. Fiducials may be detected automatically from the sensor data such as by signal processing techniques.

For example, camera data 110 may be analyzed (e.g., by image or vision processing) over time to segment the images, recognize and extract known fiducials along the vehicle path. In other examples, the fiducial selector 134 may provide a graphical user interface that can display a graphical image that has been acquired (e.g., based on camera data 110 and/or LIDAR data 108) and present a visual representation on a display device. A user thus can employ a user input device (e.g., mouse or touch screen) to provide a user input for selecting portions of the sensor data to identify one or more objects as fiducials.

The location and sensor data 122 generated by the location calculator 120 along the path of travel can be utilized to augment or generate map data 136. The map data, for example may correspond to a geospatial map that is generated based on the location data determined by the location calculator based on the sensor data 104 acquired along the path of travel. Additionally or alternatively, the map data 136 may include a geographic information system (GIS) that is designed to capture, store, manipulate, analyze, manage, and present spatial or geographic datamap information (e.g., web mapping service, such as Google Maps, OpenStreetMap or the like).

Based on the selected fiducials (by fiducial selector 134) and the map data 136, the survey data generator 132 provides corresponding survey data 102. The survey data can include path data 140 specifying geospatial coordinates along the path of travel for the vehicle reference frame. The survey data 102 also may include fiducial data 142 representing the selected fiducials along the survey path of travel provided by the path data 140. The fiducial data 142 thus can include a spatial coordinate frame of each sensed fiducial, including existing road markings, that has been determined with respect to the vehicle reference frame along the target path and defined by the path data 140. The survey data generator further may be programmed to perform a template matching function to identify existing road markings and marking data may be generated and stored in memory for each such marking. As an example, the template matching function may be implemented using "OpenCV" (open-source computer-vision) software code, such as is available on-line at https://docs.opencv.org/master/d4/dc6/tutorial_py_template_matching.html. Other templante maching function are available from other sources, such as MatLab. For example, the marking data includes marking identifier data (e.g., a type and/or ID determined by the template matching function) and location data determined by the location calculator 120 (e.g., including precision geospatial coordinates and heading for each marking). As mentioned, by storing this marking data acquired for existing markings during a survey a detailed geospatial database of road markings and other fiducials may be constructed and updated overtime. The geospatial database can be used to enable reapplication of road markings as well as used by autonomous or connected vehicles (regardless of whether the markings are visible or obstructed).

In an example, the stored marking data may be aggregated into central database of road markings. As an example, for each recorded marking, the central database may include an identifier for type, size, geospatial coordinates (e.g., latitude and longitude or other geographic datum) and heading for each marking. Additionally or alternatively, the marking data may indicate a particular standard, such as specified in the Manual on Uniform Traffic Control Devices for Streets and Highways (MUTCD), according to which the marking has been made. Additional information may include marking material type (e.g., paint, epoxy, thermoplastic, etc), color, special treatments (e.g., a particular size of retroreflective glass bead embedded), and/or material thickness. Such marking data might also include a photographic image of the applied marking if applied and, if desired, a date of application. In some examples, the marking data may be determined during survey and other operations independently of applying road markings; though, it likewise may be obtained and utilized for applying road markings.

Figure 3:
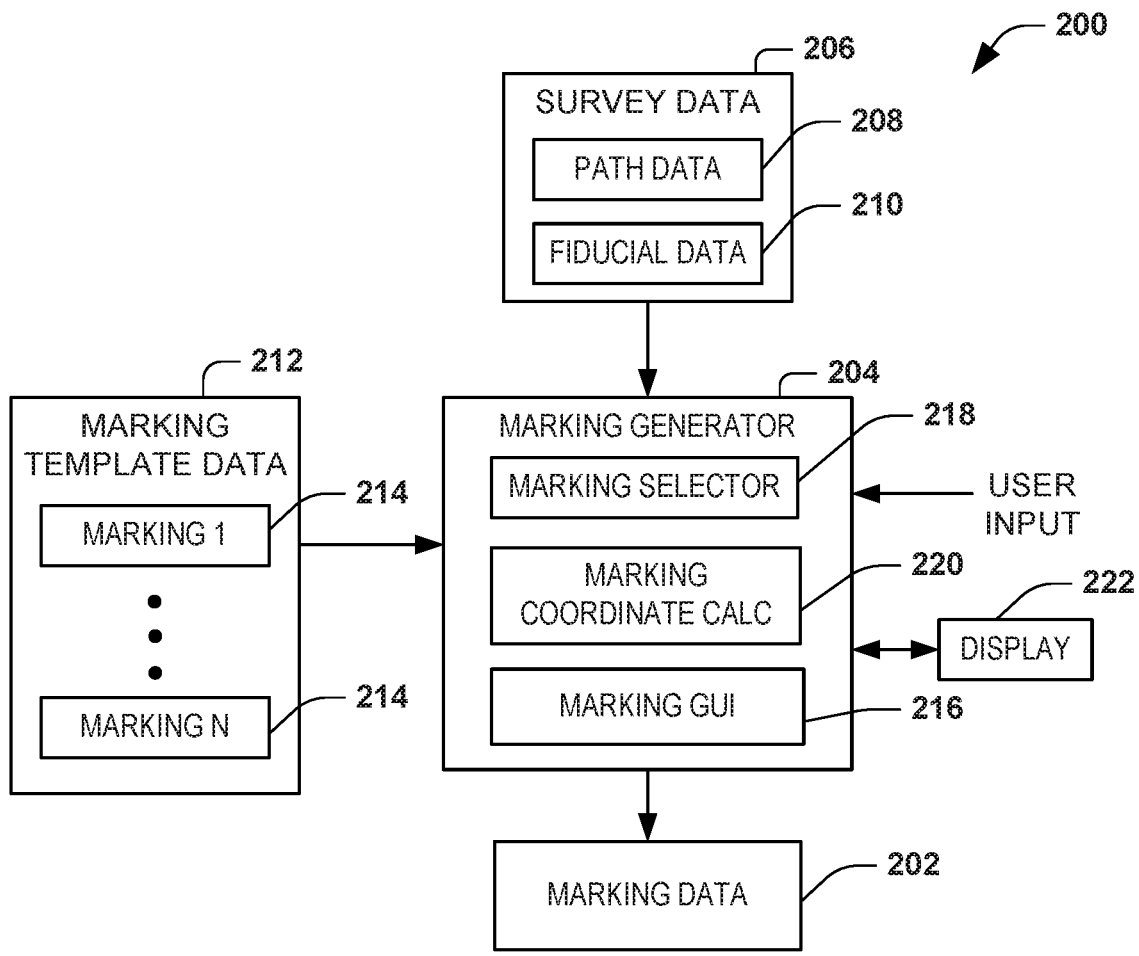
FIG. 3 depicts an example of a planning system that can be utilized to assign road markings to target locations along path of travel.

FIG. 3 depicts an example of a marking system 200 that can be utilized to generate marking data 202. The marking system 200 includes a marking generator 204. The marking generator 204 can generate the marking data 202 to specify one or more selected markings that are to be applied at respective target locations along the survey path of travel. The survey path of travel can be specified in survey data 206. The survey data 206 can include path data 208 and fiducial data 210. In an example, the survey data 206 is generated by survey system 100 of FIG. 2. In another example, the survey data 206 can be provided by another source, such as a GIS that includes a dataset for geospatial coordinates along the survey path of travel. In some examples, survey data 206 acquired for a user-specific path of travel is combined with a GIS dataset to enable the marking generator to apply markings to target locations.

For example, the path data 208 defines geospatial coordinates of a vehicle reference frame along the survey path of travel. The geospatial coordinates can be determined based on the sensor data and corresponding sensor fusion disclosed herein (e.g., including sensor weighting and sensor spatial transformations). Fiducial data 210 can represent locations of identified fiducials along the path of travel (associated with sensor data) as well as a corresponding reference frame relative to the path of travel of the vehicle.

In one example, marking template data 212 can provide templates for a plurality of different types of markings 214, demonstrated as marking 1 through marking N, where N is a positive integer denoting the different types of markings. The marking generator 204 includes a marking selector 218 to select one or more markings for placement along the vehicle path of travel. The marking generator also may include a marking GUI 216 to enable a user, in response to a user input, to select and position a selected marking at a target location within a visualization of the survey path of travel, that is presented on a display device 222. The marking selector 218 further may utilize the marking GUI 216 to graphically position a GUI element for given marking 214 at a desired target location on the display 222.

A marking coordinate calculator 220 is configured to compute a pose (e.g., spatial coordinates and an orientation) of the target location for each selected marking. For example, the marking coordinate calculator 220 can compute a marking reference frame for each selected marking having geospatial coordinates (e.g., a position and orientation) with respect to the vehicle path of travel defined by the path data 208. The marking reference frame has defined pose with respect to the target location. A user can adjust the coordinates by selectively moving the selected marking on the marking GUI 216 in response a user input (e.g., via mouse or keyboard). The size and other attributes (e.g., marking color, materials or the like) can also be adjusted by the user. In response to a user selection, the selected marking and its associated reference frame can be assigned a given pose (position and orientation) and stored as a part of the marking data. The process may be repeated along the vehicle path of travel until a full set of markings has been assigned for the survey path of travel. The resulting marking data 202 specifies each marking that is to be applied and each respective target location along the path of travel. The marking data 202 also may store corresponding fiducial data that has been associated with the path data and is stored as part of the survey data. In this way, the marking data 202 can include a selected subset of fiducials from the fiducial data 210 adjacent target locations along the path of travel as well as target locations from the path data 208 to facilitate localization of the vehicle and application tool at each respective target location as disclosed herein.

Figure 4:
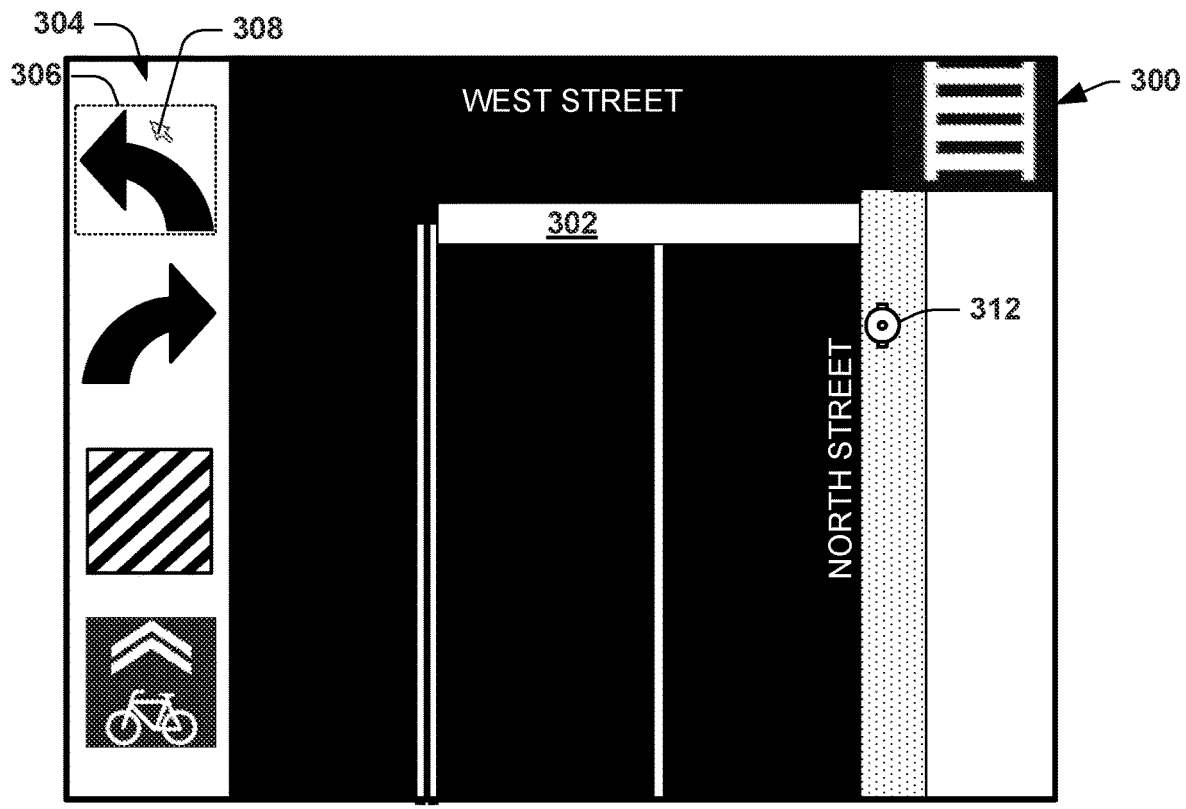
FIGS. 4 and 5 depict an example of a graphical user interface that can be utilized to assign selected markings to respective target locations.
Figure 5:
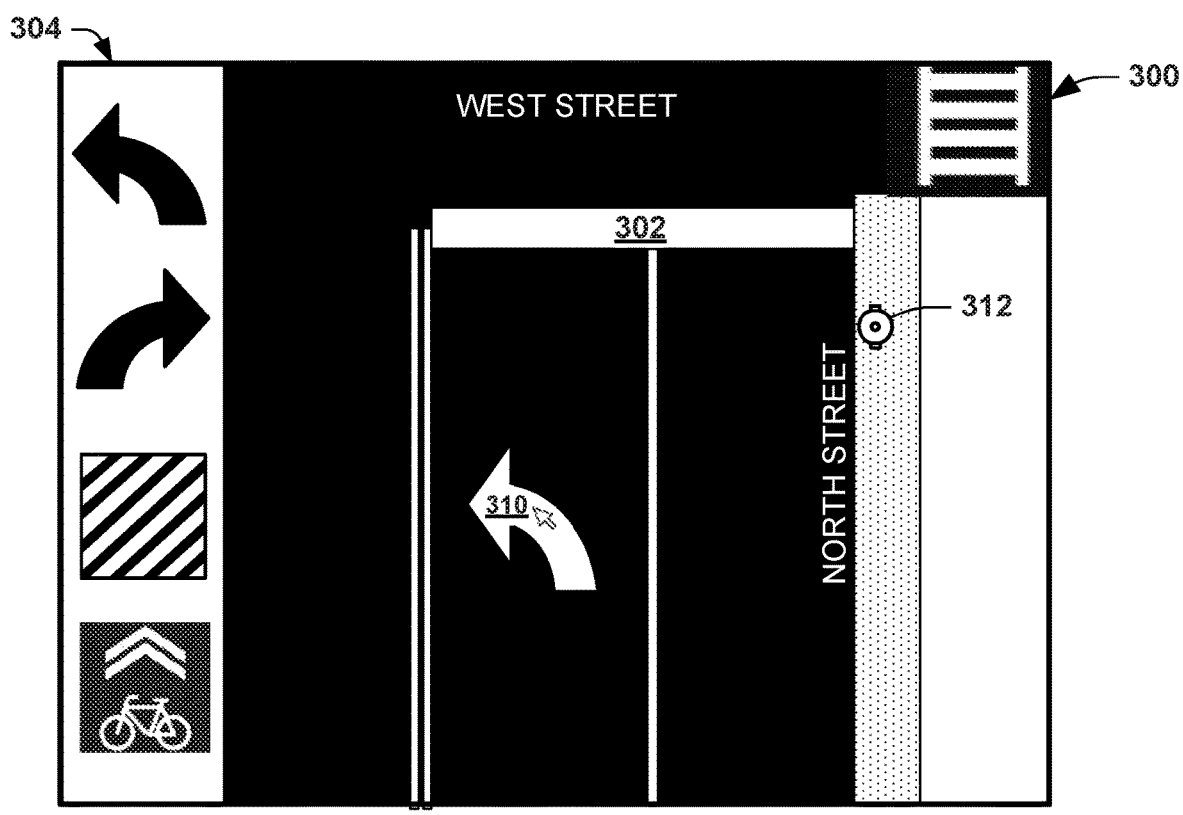

FIGS. 4 and 5 depict a simplified example of a graphical user interface 300 (e.g., corresponding to marked marking GUI 216 of FIG. 3). Thus in the example of FIGS. 4 and 5, an intersection between West Street and North Street is visualized in a graphical map. The map can be generated on a display based on survey data 206 and/or map data 136 of FIG. 2. In this example, North Street runs vertically in the page while West Street runs in a horizontal direction with respect to the page orientation of FIGS. 4 and 5. A set of marking templates 304 (e.g., corresponding to marking template data 212) is shown along the edge of the graphical map 302. In this example, the templates 304 include various potential road markings that may be selected in response to a user input. The templates include attribute data that define features (e.g., size, color, thickness, etc.) for each selected marking, such as may be user configurable and/or be assigned automatically upon selection.

In the example of FIG. 4, a left turn arrow marking has been selected, demonstrated at 306, in response to a user input via a pointer GUI element 308. A user thus may employ the pointer 308 to drag and drop the selected marking 306 to a desired target location on the graphical map 302. Thus, as shown in FIG. 5, the left turn arrow has been dragged from the template panel 304 onto a left turn lane of North Street, demonstrated at 310. A user may adjust the location relative to the illustrated roadway, as disclosed herein. In response to placement of the marking at a given location, a corresponding set of marking data for the selected marking may be generated (e.g., by marking generator 204) and stored in memory. In an example, such as where no user adjustment is made, the GUI can be programmed to automatically place the selected template at a default target location, such as by "snapping" the selected template into place in the center of the left turn lane at an appropriate distance from the stop line.

In addition to geospatial coordinates of the selected marking, the marking data 202 may also include one or more fiducials. For example, sensor data corresponding to a fire hydrant 312 can be stored as part of the marking data to facilitate localization and placement of the selected marking at the target location along an application path of travel for the vehicle. Sensor data for the fire hydrant, for example may include LIDAR data and/or camera data. In this way, if the pose of the vehicle may differ in application phase from the mapping phase (e.g., due to errors), appropriate transformations and sensor fusion may be applied to sensor data (e.g., data 104) to compute the pose of the application tool. In this way, the application tool can be precisely localized such that the differences between the application phase and survey phase may be accounted for in computing the joint-space trajectory for applying the selected marking at the target location.

Figure 6:
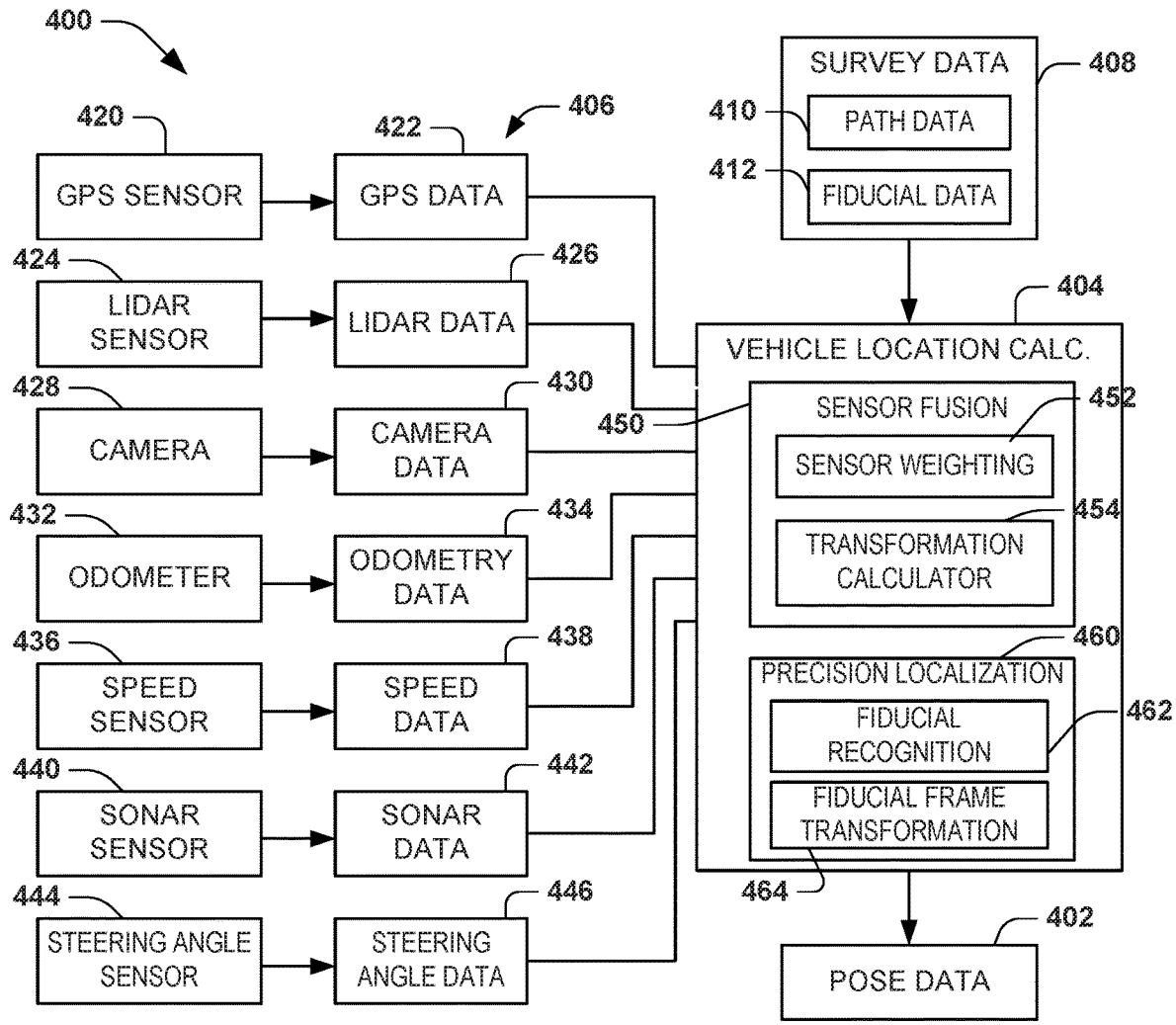
FIG. 6 depicts an example of a system to determine vehicle pose for application of markings by an application tool.

FIG. 6 depicts an example of a system 400 that includes a location calculator 404 configured to ascertain vehicle pose data 402, such as corresponding to a reference frame of the vehicle (e.g., frame 30). Since the pose of the application tool is known a priori with respect to the vehicle, the pose of the application tool is readily determined from the vehicle pose. Accordingly, the approach implemented by location calculator 404 of FIG. 6 can likewise be used to determine pose of the application tool.

The system 400 includes a vehicle location calculator 404 that is configured to determine the vehicle pose data 402 based on sensor data 406 and survey data (e.g., survey data 102 provided in FIG. 2). The vehicle pose data 402 thus can provide current (e.g., real-time) pose data 402 for the vehicle along an application path of travel. The pose data 402 can be defined by a combination of global geospatial coordinates and relative local spatial coordinates along the vehicle path of travel. As discussed with respect to FIG. 2, the survey data 408 thus can include path data 410 and fiducial data 412. The path data 408 can represent a trajectory of a reference coordinate frame of the vehicle along the path of travel. The fiducial data 412 can correspond to coordinates of various fiducials along the path of travel. For example, the fiducial data 412 can be a selected subset of fiducials along the path of travel, which may be selected (e.g., by fiducial selector 134), as disclosed herein.

The system 400, which may be implemented in the computing device on the vehicle (e.g., computing device 22) includes the plurality of sensors that provide the corresponding sensor data 406. For sake of consistency, the sensor data is the same as sensor data in FIG. 2. In other examples, different sensors and data may be used for mapping and application location determination. As disclosed herein, in some examples, the sensors may include a GPS sensor 420 and one or more other sensors. In other examples, a full complement of sensors may be utilized. In this example, the sensors include a GPS sensor 420 that provides GPS data 422, a LIDAR sensor 424 that provides LIDAR data 426, a camera sensor 428 that provides camera data 430, an odometer 432 that provides odometry data 434, a speed sensor 436 that provides speed data 438, a sonar sensor 440 that provides sonar data 442, and a steering angle sensor 444 that provides steering angle data 446. In addition or as an alternative, other sensors may be utilized, such as inertial sensors, ground penetrating radar, or the like. The location calculator 404 is configured to access each of the data 422 that is provided by the respective sensors.

The vehicle location calculator 404 includes a sensor fusion function 450 and a precision localization function 460. For example, the sensor fusion function 450 may be an instance of the same sensor fusion function 124 as discussed with respect to FIG. 2 and reference may be made back to FIG. 2 for additional information. Briefly, the sensor fusion function includes a sensor weighting function 452 and a transformation calculator 454. The sensor weighting function 452 is programmed to determine an uncertainty (e.g., error) associated with sensor data that may vary over time and topography along the path of travel. The weighting function 126 selectively weights the each unit of sensor data 104 based on a determined uncertainty associated of the respective data to facilitate accurate localization of the vehicle. For example, sensor weighting function 126 may be implemented as a Kalman filter configured to weight the respective sensor data 422, 426, 430, 434, 438, 442 and 446. In this way, the sensor fusion 450 can increase the relative influence of sensor data that is determined to have a greater amount of certainty on the location calculation by calculator 120 for each sample time instance, while reducing the relative influence of more uncertain data.

The transformation calculator 128 is programmed to apply spatial transformations to convert sensor data 422, 426, 430, 434, 438, 442 and 446 from a sensor reference coordinate frame into the vehicle reference frame along the path of travel. Accordingly, the transformation calculator provides transformed data that is normalized and provided in a common coordinate system to facilitate location computations by the location calculator 404.

The precision localization function 460 is configured to determine vehicle location and orientation based on the fused location data that has been transformed into the vehicle reference frame. Such fused location data derived from multi-modal sensors provides global (absolute) geospatial coordinates as well as local (relative) location information. As a result of the precision localization function 460 leveraging both absolute and relative location information in the fused location data, a higher level of accuracy can be maintained for the resulting pose data 402 along the path of travel.

For example, the precision localization function 460 utilizes the survey data 408, which includes the path data 410 and the fiducial data 412. The fiducial data 412 can include data identifying a selected subset of fiducials detected by respective sensors along with pose (position and orientation) for its respective fiducial reference frame, which has been transformed into the vehicle reference frame. Thus, by matching fiducials described in the survey data with fiducials in like sensor data, the precision localization function can quantify differences to help determine where each target location is in absolute coordinates with respect to the application tool.

For example, the precision localization function 460 can implement a fiducial recognition 462 to identify and extract fiducials from the corresponding sensor data (e.g., data 426, 430 and 442). The fiducial data 412 further may be used to specify expected fiducial locations. The pose of extracted fiducial may be evaluated with the pose of fiducials specified in the fidicual data 412. For example, a fiducial frame transformation function 464 is programmed to compute a spatial transform relating the pose of each currently sensed fiducial with respect to its previously identified fiducial from the fiducial data 412. For example, the transformation can involve translation in one or two directions (e.g., x or y directions) and/or rotation about the Z axis. Examples of approaches that can be utilized to determine the fiducial transformation can include iterative closest point or particle filtering methods. Other mathematical methods may be utilized in other examples.

In this way, the precision localization 460 can use recognized fiducial locations as provided by fiducial data 412 along the vehicle path to generate the pose data 402 with increased precision, since it is adjusted based on detecting differences between fiducial pose in the fiducial data 412 and the weighted and transformed current sensor data 406. Fiducial data thus may be provided during the application phase by any number of sensors that can be aggregated based upon the sensor weighting and corresponding transformations provided by the sensor fusion function 450.

By way of further example, the precision localization function 460 can employ transformation function 464 to compute the pose of the vehicle (or the application tool) with respect to a given reference frame. For example, if $T_{fidN/cam}$ expresses the position and orientation of the Nth fiducial coordinate frame with respect to the coordinate frame of camera sensor 428, The transformation 464 can compute:

$$T_{fidN/tool} = T_{cam/tool} * T_{fidN/cam}.$$

A similar transform may be computed for other sensors.

For localization during the application phase, an approximation of the vehicle pose and/or application tool will be calculated and updated along the path of travel, and based on its pose and the fiducial data 412, the fiducial recognition function 462 can have an expectation of what fiducials may be detectable. For example, given an image of an expected fiducial while the vehicle is within a distance of the fiducial (e.g., specified in the survey data 408), the transformation 464 can compute the corresponding $T_{fidN/cam}$ using image processing. However, the survey data 408 generated from the previous mapping run (and post processing) may establish the coordinates of such fiducial N to be $T_{fidN/0}$. The transformation function 464 thus can compute the reference frame of the application tool, such as follows:

$$T_{tool/0} = T_{fidN/0} * (T_{fidN/tool})^{-1}$$

As a result, using sensor processing to match new and previously detected fiducials, the precision localization function 460 can compute the pose of the vehicle and/or tool precisely with respect to fiducials. Since the fiducials are pre-mapped such that their coordinates are known with respect to a reference frame (in fiducial data 412), the precision localization function 460 can, in turn, compute the pose of the application tool with respect to the same reference frame.

For example, incremental motion of the vehicle may be estimated along the path of travel based on other sensor data acquired by the at least one other sensor along the application path of travel from a first location to a second location. Thus, the pose of the application tool can be updated based on the estimated incremental motion (estimated from the other sensor data) along the portion of the application path of travel between the first location and the second location. In some examples, the first and second locations correspond to the pose of respective first and second fiducials detected along the path of travel. In other examples, the locations can be geospatial coordinates of the vehicle (or application tool). Each of the locations may be derived from sensor data from a single sensor or from fused sensor data determined (e.g., by sensor fusion function) from multiple sensors, as disclosed herein.

As a further example, each time a fiducial from one or more of the sensors is recognized and processed, the corresponding vehicle pose data 402 can be updated accordingly. As an example, if the reference frame of the application tool starts at a known pose (e.g., having originally recognized a fiducial from the sensor data corresponding to a known fiducial 412, incremental motion from the starting pose can be estimated from other sensor data (e.g., wheel encoders, steering angle data, accelerometer data, precision odometry, speed sensor data, ground penetrating radar data, gyroscope data, inertial sensor data, LIDAR and the like) that can be compared to the pre-mapped fiducial data and path data 410. Thus, when GPS data may have uncertainty its location may be augmented from location transformations determined for other sensor data, including fiducials detected from such other sensor data. Even though computing such incremental motion from a known reference pose may gradually accumulate localization uncertainty errors, as the other sensor data is acquired, including fiducials that are recognized (e.g., by fiducial recognition function 462) along the vehicle path of travel based on corresponding sensor data 406 and spatial transforms computed, such localization uncertainty may be mitigated.

Figure 7:
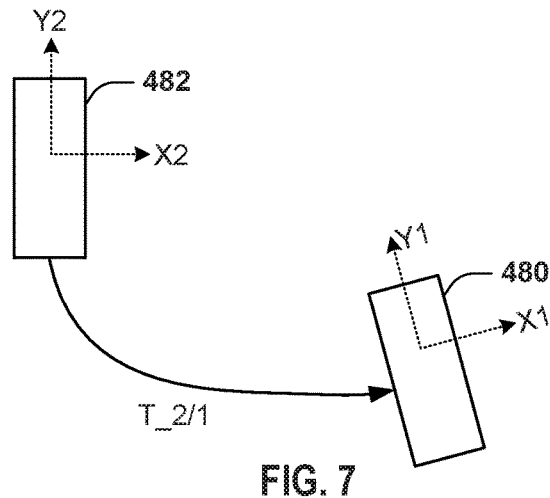
FIG. 7 depicts an example of sensed fiducial illustrating application of a spatial transformation with respect to different sensor data sets for the sensed fiducial.

FIG. 7 illustrates an example of a fiducial transformation that may be implemented. In FIG. 7, a pair of fiducials 480 and 482 is shown. For example, a fiducial 480 corresponds to an image that is has been selected and stored in survey data 408 (fiducial data 412 and the path data 408). The other fiducial 482 corresponds to the same fiducial captured by sensor data 406 (e.g., camera data 430) as recognized by fiducial recognition function 462. Fiducial transformation function 464 can compute a spatial transform from the pose of the second fiducial 482 to pose of the first fiducial 480, such as described above. This transformation can include translation and/or rotation of the fiducial corresponding to a distance (e.g., Euclidean or other distance calculation) that the reference frame of image 482 must move to align the references frames of respective fiducials 480 and 482. Since each sensor reference frame is known with respect to the vehicle reference frame, corresponding spatial coordinates of the vehicle can be ascertained as disclosed herein. Similarly, since the application tool's reference frame is known relative to the vehicle reference frame, the corresponding transformation may further be adjusted to ascertain the pose of the application tool reference frame to the same precision.

Figure 8:
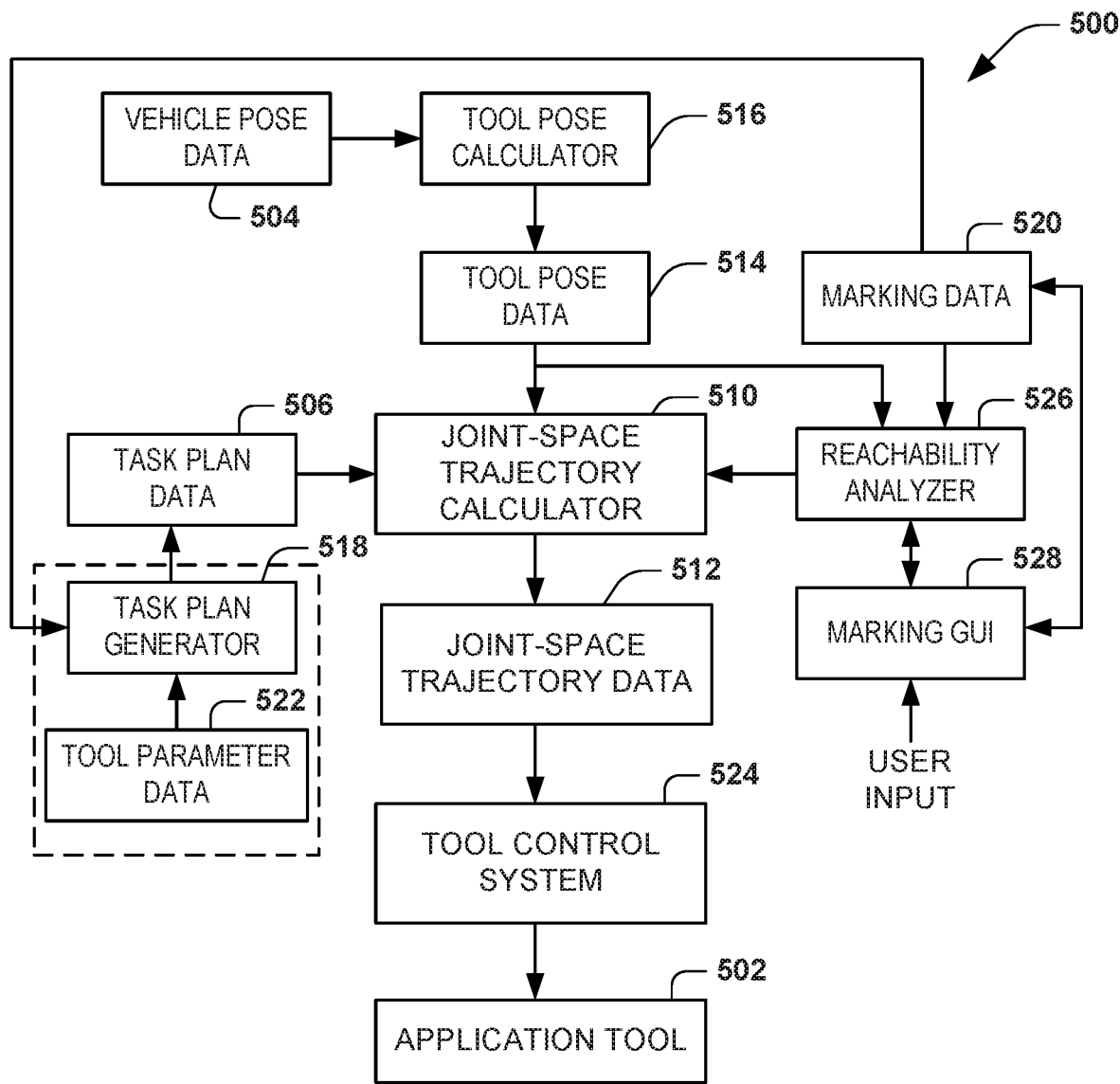
FIG. 8 depicts an example of a system to control an application tool for applying a selected market at a target location.

FIG. 8 depicts an example of a system 500 that can be implemented to control application of markings to target locations. The system 500, for example can be implemented by the system 10 that is integrated into the vehicle 12. In other examples, some of the parts of the system 500 may be integrated into a computing device that is carried on a vehicle whereas others may be implemented in a distributed computing arrangement, such as in a cloud or at a server that may be separate from a vehicle. For example, the computing system on a vehicle may employ a wireless network (e.g., via network interface 44) that can access data and functions implemented remotely. In the following example, however, it is assumed that the computing device on the vehicle is configured to implement the controls for using the application tool 502 to apply one or more markings at target locations.

The system 500 includes a joint-trajectory calculator 510. The joint-trajectory calculator is configured to compute joint-trajectory data 512 based on task plan data 506 and tool pose data 514. As mentioned, the tool pose data 514 can define the spatial coordinates and orientation of a reference frame of the application tool. The tool pose data 514 can be determined by a precision localization function as disclosed herein (see, e.g., FIG. 6). For example, a tool pose calculator 516 can convert the vehicle pose data 504 into the tool pose data by applying a corresponding transformation based on the known location and orientation of the tool reference plan relative to the vehicle reference frame.

A task plan generator 518 is configured to generate the task plan data based on the marking data 520 and to a parameter data 522. While the task plan generator is shown as part of the system 500, in some examples, the task plan may be implemented as part of the system 200 of FIG. 3. The marking data 520, for example, corresponds to marking data that is generated by marking generator 204 of FIG. 3. The marking data 520 thus can identify the selected marking, as well as geospatial coordinates and orientation of a marking reference frame thereof. Based on the marking data 520 and tool parameter data 522, the task plan generator 508 can derive a task plan, to define a process path that is executable by the application tool to apply the marking independent of tool location. The tool parameter data 522, for example, may specify a distance between a spray head and the surface to apply the marking, a width of the spray at such distance and other parameters to apply the selected marking by the tool 502. In this way, the task plan data 506 provides a set of instructions that can be executed by the application tool to apply the selected markings in Cartesian space, which is independent of the specified target location and pose of the application tool 502.

The joint-trajectory calculator 510 thus computes the joint-trajectory data 512 to include corresponding instructions to enable the application tool 502 to apply the selected marking at the target location based on the task plan data 506 and current tool pose data 514. For example, the joint-trajectory calculator 510 implements inverse kinematics to map the task plan for the selected marking in Cartesian space into joint space of the application tool. The particular mapping and joint-space trajectory will depend on the configuration of the application tool (e.g., number of joints, actuators, length of arms and the like).

As an example, the vehicle is utilized to position the robot to an estimated location, which yields a current tool pose. The joint-space trajectory calculator 510 is programmed to employ inverse kinematics on the task plan for the selected marking and based on the actual pose of the application tool 502 to derive a set of instructions (data 512) in the tool's joint space to apply the selected marking at the desired target location within a desired level of precision. In this way, despite being displaced from the nominal coordinates for applying the selected marking at the target location, the joint-space trajectory data 512 compensates for the difference in tool pose from target location to ensure that the selected marking is applied at the desired target location. A tool control system 524 thus interprets the joint-space trajectory data 512 into a series of instructions for controlling the application tool 502 for applying the marking at the desired target location.

Since the application tool 502 is capable of applying marking at coordinates with respect to its reference frame over a corresponding reachability zone, the pose of the application tool 502 must be within a corresponding zone of reachability to enable the selected marking to be applied at the target location. Accordingly, the system 500 may include a reachability analyzer 526 to ascertain whether the tool pose is within the zone of reachability provided by the target location in the marking data 520. The reachability analyzer 526 can provide guidance to a marking user interface 528. For example, the marking user interface 528 can provide guidance (e.g., audible and/or visual guidance) to a user. The guidance can indicate whether or not the current tool pose is sufficiently within the zone of reachability to enable the application tool 502 to apply the marking (or at least a substantial portion thereof) at the target location. Thus, by positioning the application tool (e.g., painting robot) at an approximation to a desired pose, the system 500 is configured to transform the desired marking coordinates to a joint-space trajectory to accommodate the actual pose of the robot relative to target location on the surface. In this way, the robot can be displaced from nominal coordinates yet continue to apply markings precisely where desired on the surface.

In some examples, the marking user interface 528 can receive a user input response to instructions from a user input device (e.g., mouse, keypad, touch pad, touch screen or the like). For example, the instructions may include confirmation by the user to begin the marking process and apply the selected marking at the target location. In another example, the marking user interface 528 may be implemented as a GUI that displays a graphical representation of the selected marking at the target location that has been calculated. The user can view the selected marking superimposed on an actual image (e.g., from surface facing camera) that is presented on a display device of the computing device. Based on the image showing where the marking will be applied, the user may make a more informed decision about whether to confirm or reject applying the marking at such location. If the user rejects the application at the current target location, the marking user interface 528 may further present a GUI to enable the user to graphically adjust the target location relative to the displayed camera image in response to a user input. If the user adjusts the target location, an adjusted target location may be provided with identifying data for the marking and stored in memory as the marking data 520. The adjusted target location also can in turn be provided to the joint-space trajectory calculator 510 for re-calculating the joint-space trajectory data 512 based on the adjusted target location for the selected marking. In this way, adjustments to the target location of the selected image may be made on the fly to further ensure that the selected marking is applied at a desired location. The GUI further may be enable the user to adjust the size of the selected marking or replace the selected marking with a different marking. In some examples, the same process of selecting a marking (new or overpainting) to a apply at a new target location, viewing a graphical representation of the selected marking and providing a user input to adjust the target location for such marking may be used in the field in addition or as an alternative to the predefined marking data.

By way of further example, the marking user interface 528 includes a GUI that displays a graphical representation of a new marking that is to be applied to a user-selected target location, which may be a clean surface or include an existing marking. This may be performed during a survey and/or during application process in the field, such as when a determination is made that a particular marking should be applied at the user-selected target location but was not part of the original task plan data 506. In an example where the new marking is to overpaint an existing marking, the GUI may be programmed to perform template matching (or another image processing function, such as edge detection) to identify the existing marking and generate a graphical representational overlay at the target location for the marking that is to be applied. In an additional or alternative example where a new marking is to be applied at the target location, the user can select a desired marking from a database of known markings in response to a user input instruction by a user input device (e.g., via mouse, keyboard, joystick or the like). As an example, the database may include markings from the MUTCD as well as various jurisdictionally-specified analogs (e.g., as described by federal, state or other more local departments of transportation), such as may set forth standardized pavement marking specifications for use on respective roadways. The database further may include information describing such items as smaller-scale arrows or lettered markings, such as for use in parking lots, on off-road trails, on private roads such as driveways, camp roads, and the like. Thus, the GUI can generate a graphical template of a given user-selected marking, which may be customized according to a target location captured (in real time) by the camera. A corresponding target location that is selected for the marking may be derived from GPS (e.g., geospatial coordinates) as well as other sensors, such as disclosed herein. Additionally, the GUI of the marking user interface 528 enables the user to graphically adjust the user-selected target location and/or orientation of the marking relative to the displayed camera image in response to another user input instruction. If the user adjusts the target location or pose of the marking, adjusted geospatial coordinates for the target location may be derived from the GPS and other sensors.

The user-selected marking (marking identifier data) and final geospatial coordinates and heading of the new marking are stored in memory as additional marking data 520. The additional marking data 520 may be used to apply the user-selected marking now or deferred until a later time. If the application is to be deferred, the marking data may be fed into and stored as part of the task plan data 506. When such marking is to be applied (now or at a later time), the marking data (marking identifier and target location) are provided to the joint-space trajectory calculator 510 for calculating the joint-space trajectory data 512 based on the new target location for the user-selected marking as well as based on a current position and orientation of the application tool (e.g., derived from the current pose of the vehicle) to enable the tool to apply such marking precisely at the target location. The tool controller thus is configured to control the application tool to apply the new marking at the user-selected target location based on the corresponding joint-space trajectory. As disclosed herein, the user-selected target location may either have no existing marking or have an existing marking.

Figure 9:
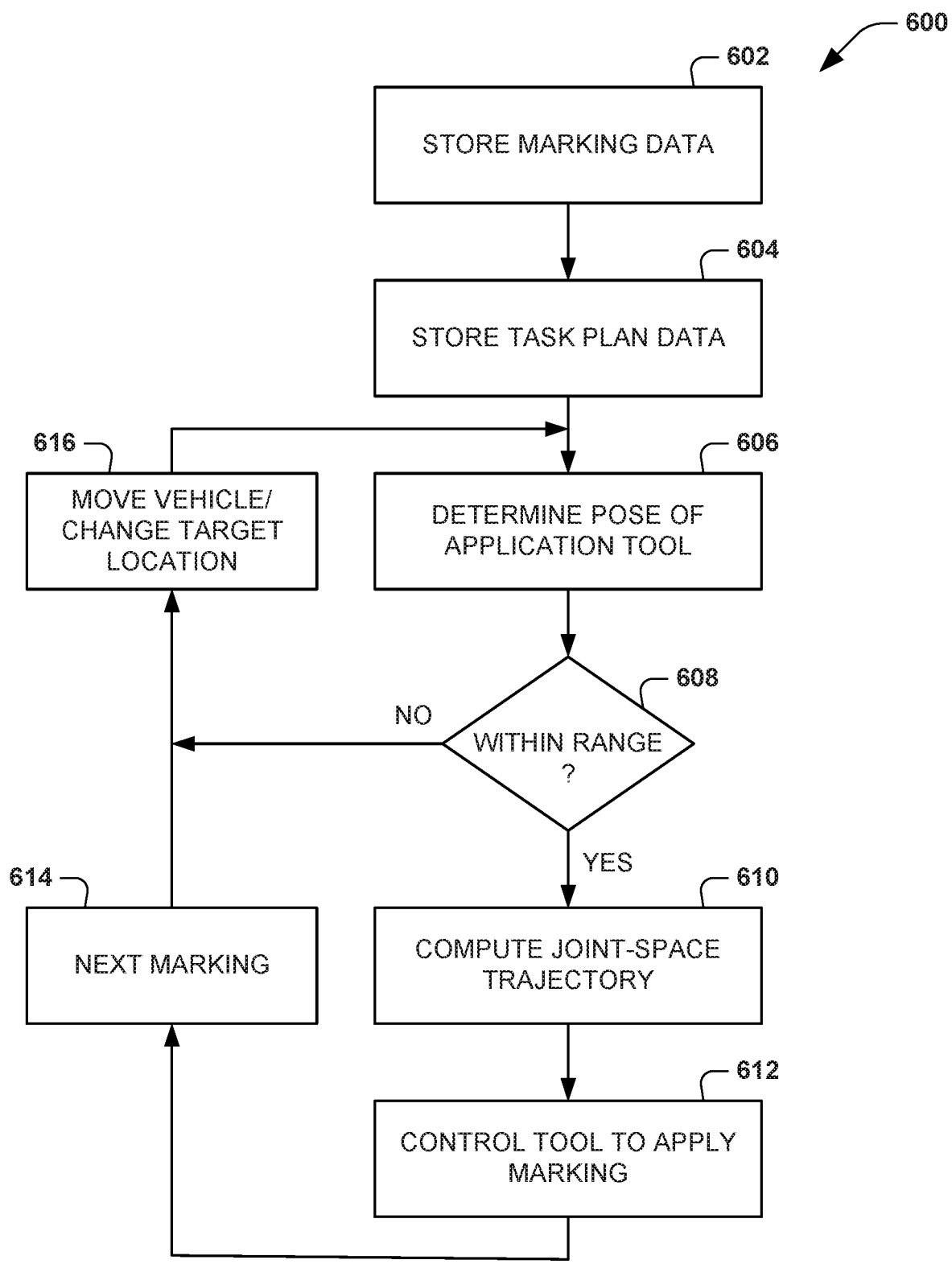
FIG. 9 is a flow diagram depicting an example of a method to control applying markings to a surface.
Figure 10:
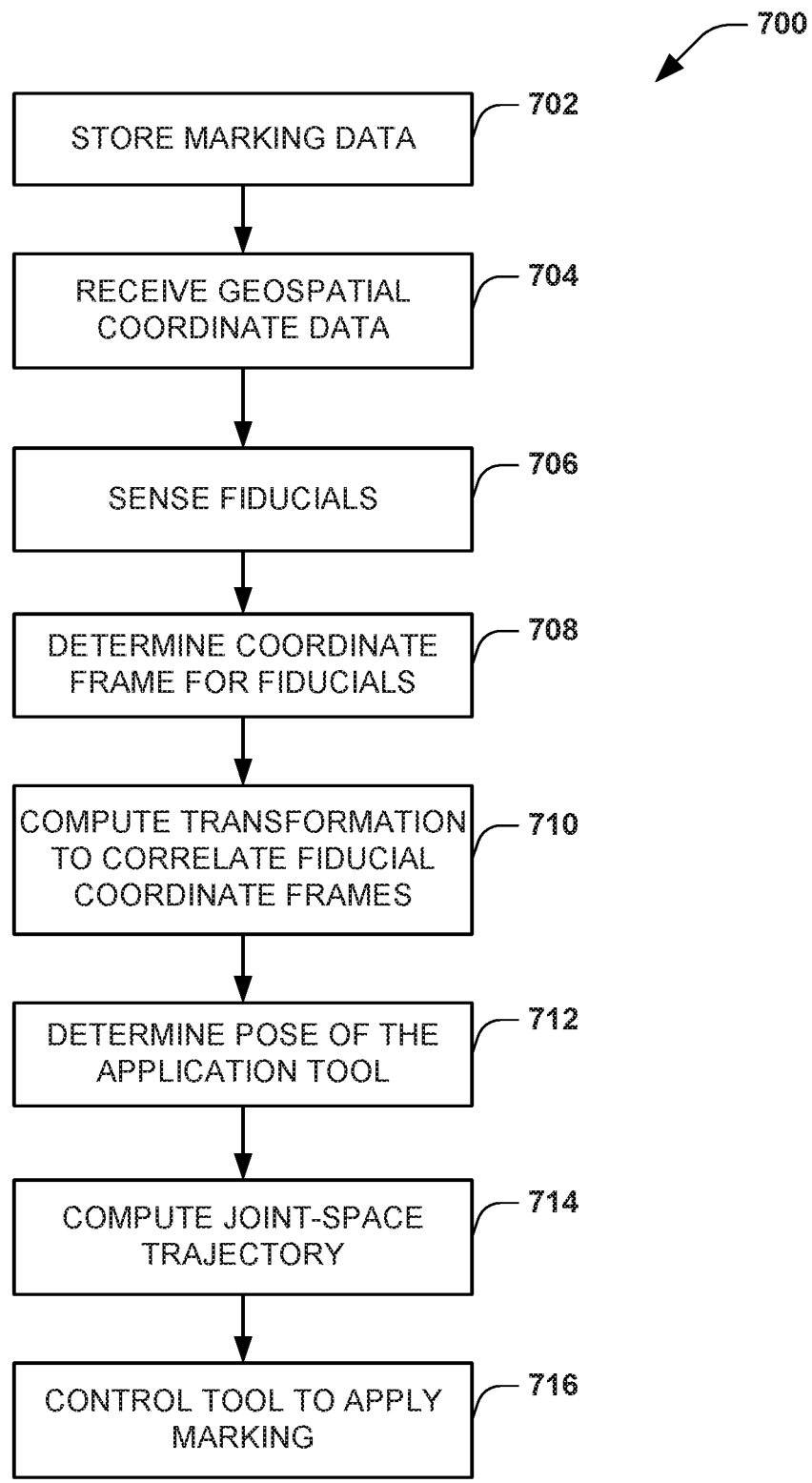
FIG. 10 is a flow diagram depicting another example method to control applying markings to a surface.

In view of the foregoing structural and functional features described above, a method in accordance with various aspects of the present disclosure will be better appreciated with reference to FIGS. 9-10. While, for purposes of simplicity of explanation, the methods are shown and described as executing serially, such methods are not limited by the illustrated order. Some actions could occur in different orders and/or concurrently from that shown. Moreover, not all illustrated features may be required to implement a method. The method may be implemented by hardware (e.g., implemented in one or more computers, field programmable gate array (FPGA) and/or by discrete components), firmware and/or software (e.g., machine readable instructions stored in non-transitory media) or a combination of hardware and software.

FIG. 9 depicts an example method 600 for applying a selected marking to a target location. The method may be implemented utilizing any of the hardware and/or software disclosed herein with respect to FIGS. 1-6 and 8. The method 600 begins at 602 in which marking data is stored (e.g., in non-transitory machine-readable media). The marking data (e.g., data 34, 202, 520) can specify a selected marking that is to be applied at a respective target location, such as disclosed herein. A target location can be specified as geospatial coordinates and orientation (e.g., marking codes) with respect to a reference frame of the selected marking.

At 604, corresponding task plan data can also be stored (in memory). The task plan data can specify a process plan to create the selected mark with respect to a marking reference frame (part of the marking data stored at 602) and various tool parameters. For example, the task plan data can be stored as a vector graphic to describe the path of a corresponding paint head to apply the selected marking in Cartesian (2D or 3D) space. The task plan is independent of the target location. As an example, a respective task plan may be associated with each available marking for a given application tool. If the application tool changes, the task plan may be adapted accordingly.

At 606, a current pose of the application tool is determined. As disclosed herein, the pose of the application tool can be determined (e.g., by location calculator 38, 404) based on sensor data acquired from one or more sensors (e.g., 14, 16, 18, 406) having known positions with respect to the vehicle. At 608, a determination is made whether the target location is within the zone of reachability for the application tool based on the pose at 606. If the target location is within range, the method proceeds to 610 and a joint-space trajectory is computed. The joint-space trajectory can be computed (e.g, by marking control 40, calculator 510) based on the task plan data at 604 and the determined current pose of the application tool provided at 606. The joint-space trajectory enables the application tool to apply the selected markings at the target location provided at 606.

If the determination at 608 indicates that the target location is not within range (e.g., determined by reachability analyzer 5206) of the application tool for applying the selected marking or at least a substantial portion thereof, the method proceeds to 616 in which the vehicle can be moved or the target location adjusted. Based upon the vehicle movement and/or adjustment of target location, the method can return to 606. This process can repeat until determining at 608 that the target location is within the zone of reachability of the application tool. After the joint-space trajectory has been computed at 610, the method proceeds to 612 in which the application tool is controlled (e.g., by controller 26, 524) to apply the marking according to the joint-space trajectory associated with the determined pose of the application tool at 606. After the marking has been applied at 612, a next marking can be accessed at 614, such as described in the marking data and loaded into memory for applying the next selected marking at its respective next target location. The vehicle may be moved at 616 and/or the target location changed at 616 such that the next marking resides within the zone of reachability for the tool. It is understood that the next marking may be identical or different and further may be adjusted based on a selection of the user.

FIG. 10 is a flow diagram depicting another example method 700 to control applying markings to a surface. At 702, the method includes storing marking data (e.g., data 34, 202, 520) to specify at least one marking that an application tool is to apply at a target location along an application path of travel for the vehicle. At 704, geospatial coordinate data is received (e.g., a GPS device 14, 410) to represent a current pose of a vehicle along the application path of travel for the vehicle. At 706, fiducials are sensed by at least one other sensor (e.g., 16, 18, 424, 428, 432, 436, 440, 444) along the application path of travel. The sensed data can be stored in one or more non-transitory machine-readable media. At 708, fiducial data representing a fiducial coordinate frame for each of the sensed fiducials is determined from such sensor data (e.g., by sensor fusion function 36, 450 or precision localization function) along the application path of travel with respect to a reference coordinate frame.

At 710, a transformation is computed (e.g., by sensor fusion function 36, transformation calculator 464) to correlate the fiducial coordinate frame for each of the sensed fiducials along the application path of travel to a spatial coordinate frame for respective fiducials sensed along a previous survey path of travel. The application path of travel by the vehicle is to approximate the survey path of travel (e.g., by driving the vehicle along the same road). At 712, a pose of the application tool is determined (e.g., by location calculator 38, 404, 460) along the application path of travel based on the transformation and the geospatial coordinate data.

At 714, a joint-space trajectory is computed (e.g, by marking control 40, calculator 510) based on the pose of the application tool and task plan data to enable the application tool to apply the at least one marking at the target location. In some examples, a determination may be made (like at 608 of FIG. 9) to condition the computation at 714 depending on whether the target location is within the current reachability of the application tool and/or whether the target location is considered satisfactory by the user. At 716, the tool is controlled to apply the marking based on the computed joint-space trajectory. The method may be repeated for each marking that is to be applied along the vehicle path of travel, as provided in the marking data.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims. As used herein, the term "includes" means includes but not limited to, the term "including" means including but not limited to what is listed. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system to apply markings to a surface, the system comprising:
   an application tool having a joint space, the application tool comprising a robot having a dispensing tool to dispense material;
   one or more non-transitory machine-readable media to store instructions, marking data and task plan data, the marking data describing at least one selected marking to apply at a target location, including a marking reference frame for the selected marking that is to be applied, the task plan data describing a process of applying the selected marking based on at least one parameter of the application tool independent of the target location;
   a processor to execute the instructions to at least:
   determine a pose of the marking reference frame with respect to the application tool; and
   compute a joint-space trajectory to enable the application tool to apply the selected marking at the target location based on the task plan data, the pose of the marking reference frame and a pose of the application tool;
   a tool controller configured to control the joint space of the application tool and use the dispensing tool to apply the selected marking at the target location based on the joint-space trajectory;
   generate an interactive graphical user interface (GUI) to display a graphical representation of the selected marking superimposed onto an image of the target location;
   in response to a user input instruction received via the GUI rejecting application of the selected marking at the target location, determine an updated location and/or orientation of the application tool based on a vehicle being moved to an updated position, the vehicle carrying the application tool; and
   compute a modified joint-space trajectory to enable the application tool to apply the selected marking at the target location based on the task plan data and the updated location and orientation of the application tool, wherein the tool controller is configured to control the application tool to apply the marking at the target location based on the modified joint-space trajectory.

2. The system of claim 1, wherein the processor is to further execute the instructions to at least:
   generate guidance to inform a vehicle operator whether or not the application tool is within a marking zone that defines a spatial region from which the application tool has sufficient reachability to apply at least a substantial portion of the selected marking at the target location.

3. The system of claim 1, wherein the processor is to further execute the instructions to at least:
   enable the tool controller to execute the joint-space trajectory in response to a user input instruction confirming application of the selected marking at the target location; and
   disable the tool controller from executing the joint-space trajectory in response to a user input instruction rejecting application of the selected marking at the target location.

4. The system of claim 1, wherein the processor is to further execute the instructions to at least:
   in response to the user input instruction via the GUI rejecting application of the selected marking at the target location, receive a user input via the GUI to adjust the target location to a modified target location; and
   compute a modified joint-space trajectory to enable the application tool to apply the selected marking at the modified target location based on the pose of the marking reference frame, the task plan data and the pose of the application tool, wherein the tool controller is configured to control the application tool to apply the marking at the modified target location based on the modified joint-space trajectory.

5. The system of claim 1, wherein the selected marking and/or target location covers a region extending beyond a reachability of the application tool, the processor is to further execute the instructions to intermittently re-compute the joint-space trajectory based on the task plan data, the pose of the marking that is to be applied and the pose of the application tool at each of a plurality of spaced apart locations, wherein the tool controller is configured to control the application tool to apply the marking at each of the spaced apart locations based on the re-computed joint-space trajectory.

6. The system of claim 1, further comprising:
a global positioning system device to provide geospatial coordinates of the vehicle along a vehicle path of travel, the vehicle carrying the application tool along a vehicle path of travel; and
at least one other sensor configured to sense fiducials along the vehicle path of travel, the processor further programmed to determine location data from the geospatial coordinates and the sensed fiducials, the location data being representative of an absolute spatial location of the vehicle along the vehicle path of travel, wherein the processor is further programmed to determine the pose of the application tool based on the location data.

7. The system of claim 6, wherein the vehicle path of travel is an application path of travel for the vehicle during which each selected marking is to be applied to the surface by the application tool based on the marking data,
the system further comprising at least one other sensor to sense the fiducials as the vehicle moves along the application path of travel;
wherein the non-transitory machine-readable media further stores survey data based on the location data acquired during a previous vehicle trajectory along a survey path of travel, the survey data including fiducial survey data describing a reference coordinate frame for each of a plurality of sensed fiducials along the survey path of travel, the target location for each selected marking being set based on the survey data including the fiducial survey data;
wherein the processor is to further execute the instructions to at least:
determine a spatial coordinate frame for fiducials sensed by the at least one other sensor along the application path of travel;
compute a transformation to correlate the spatial coordinate frame for each of the sensed fiducials along the application path of travel to the spatial coordinate frame determined for each respective fiducial sensed along the survey path of travel; and
determine the pose of the application tool along the application path of travel based on the transformation and the geospatial coordinates of the vehicle along the vehicle path of travel.

8. The system of claim 7, wherein the plurality of sensed fiducials along the survey path of travel are selected in response to a user input from the fiducials sensed by the at least one other sensor during the survey path of travel.

9. The system of claim 6, wherein the at least one other sensor comprises a camera configured to provide a graphical image of a marking zone representing a spatial region from which the application tool has sufficient reachability to apply at least a substantial portion of the selected marking at the target location.

10. The system of claim 1, further comprising
a global positioning system device to provide geospatial data representing the pose of the vehicle reference frame of a vehicle carrying the application tool; and
at least one other sensor configured to provide other sensor data,
wherein the processor is to further execute the instructions to fuse the other sensor data with the geospatial data to provide fused location data representing the pose of the application tool or a pose of the vehicle.

11. The system of claim 1, wherein the processor is to further execute the instructions to at least:
in response to a user input instruction received via the GUI to provide a new marking, store new marking data in the non-transitory machine-readable media, the new marking data including a marking identifier to identify the new marking, a heading of the new marking and geospatial coordinates specifying a user-selected target location where the new marking it to be applied.

12. The system of claim 11, wherein, in response to a user input instruction received via the GUI to apply the new marking, the processor is to further execute the instructions to at least:
determine a current pose of the application tool based on the current pose of the vehicle carrying the application tool; and
compute a corresponding joint-space trajectory to enable the application tool to apply the new marking at the user-selected target location based on the new marking data and the current pose of the application tool, wherein the tool controller is configured to control the application tool to apply the new marking at the user-selected target location based on the corresponding joint-space trajectory, wherein the user-selected target location either has no existing marking or has an existing marking.

13. The system of claim 1, further comprising a camera configured to provide a graphical image of a marking zone, the marking zone representing a spatial region from which the application tool has sufficient reachability to apply at least a substantial portion of the selected marking at the target location, the pose of the marking reference frame being determined relative to the marking zone based on the graphical image.

14. The system of claim 1, wherein the tool controller is configured to control the application tool to apply the selected marking on the surface while the vehicle is stationary.

15. The system of claim 1, wherein the task plan data comprises a vector graphic to describe the path of a nozzle of the application tool to apply the selected marking.

16. The system of claim 1, wherein the application tool to apply the selected marking is configured to at least one of add a graphical object to the surface, remove a portion of the surface or change the surface.

17. A method comprising:
storing marking data to specify at least one marking that an application tool, which is carried by a vehicle, is to apply at a target location for the vehicle, the marking data including a marking reference frame for the at least one marking independent of the target location;
receiving geospatial coordinate data from a global positioning system device to represent a current pose of a vehicle;
sensing passive fiducials by at least one other sensor, the passive fiducials having a fixed pose;
determining fiducial data representing a fiducial coordinate frame for the sensed fiducials with respect to a reference coordinate frame;
computing a transformation to correlate the fiducial coordinate frame for the sensed fiducials to a spatial coordinate frame for respective fiducials sensed along a previous survey path of travel;
determining a pose of the marking reference frame with respect to the application tool based on the transformation and the geospatial coordinate data;

computing a joint-space trajectory to enable the application tool to apply the at least one marking at the target location based on the pose of the marking reference frame, a pose of the application tool and task plan data;

generating a graphical representation of the selected marking superimposed onto an image of the target location;

in response to a user input instruction rejecting application of the selected marking at the target location, moving the vehicle and determining an updated target location and/or orientation of the application tool based on the vehicle being moved; and computing a modified joint-space trajectory to enable the application tool to apply the selected marking at the updated target location based on the task plan data and the updated target location of the application tool, the application tool being controlled to apply the marking at the target location based on the modified joint-space trajectory.

18. The method of claim 17, further comprising:

in response to a user input instruction confirming to apply the selected marking at the target location, controlling the application tool to apply the marking at the target location based on the computed joint-space trajectory.

19. The method of claim 17, wherein in response to the user input instruction rejecting application of the selected marking at the target location, the method further comprises:

receiving a user input to adjust the target location to a modified target location;

computing a modified joint-space trajectory to enable the application tool to apply the selected marking at the modified target location based on the pose of the marking reference frame, the task plan data and the determined location of the application tool; and controlling the application tool to apply the marking at the modified target location based on the modified joint-space trajectory.

20. The method of claim 17, further comprising:

estimating incremental motion of the vehicle along an application path of travel based on other sensor data acquired by the at least one other sensor along the application path of travel from a first location to a second location, wherein the pose of the marking reference frame with respect to the application tool is updated based on the estimated incremental motion along a portion of the application path of travel between the first location and the second location.

21. The method of claim 17, further comprising:

displaying an interactive graphical user interface (GUI); and in response to a user input instruction received via the GUI to provide a new marking, storing new marking data in the non-transitory machine-readable media, the new marking data including a marking identifier to identify the new marking, a heading of the new marking and geospatial coordinates specifying a user-selected target location where the new marking it to be applied.

22. A system to apply markings to a surface, the system comprising:

a global positioning system device to provide geospatial coordinate data representing a current pose of a vehicle carrying an application tool;

at least one fiducial sensor to sense fiducials;

one or more non-transitory machine-readable media to store instructions and marking data, the marking data describing at least one selected marking that the application tool is to apply at a target location, including a marking reference frame for the selected marking;

a processor to execute the instructions to at least:

determine a spatial coordinate frame for the fiducials sensed by the at least one fiducial sensor;

compute a transformation to correlate the spatial coordinate frame for the sensed fiducials to the spatial coordinate frame determined for respective fiducials sensed along a previous survey path of travel;

determine a pose of the marking reference frame with respect to the application tool based on the transformation and the geospatial coordinate data; and compute a joint-space trajectory based on the pose of the marking reference frame, the pose of the application tool and task plan data to enable the application tool to apply the at least one selected marking at the target location;

generate a graphical representation of the selected marking superimposed onto a real-time image of the surface that includes the target location;

in response to a user input instruction rejecting application of the selected marking at the target location, determining an updated location and/or orientation of the application tool based on the vehicle being moved to an updated position; and compute a modified joint-space trajectory to enable the application tool to apply the selected marking at the target location based on the task plan data and the updated location and orientation of the application tool, wherein the tool controller is configured to control the application tool to apply the marking at the target location based on the modified joint-space trajectory.

23. The system of claim 22, wherein the system further comprises a tool controller configured to control the application tool to apply the selected marking at the target location based on the computed joint-space trajectory.

24. The system of claim 23, wherein the processor is to further execute the instructions to at least:

enable the tool controller to execute the joint-space trajectory in response to a user input instruction confirming application of the selected marking at the target location; and disable the tool controller from executing the joint-space trajectory in response to a user input instruction rejecting application of the selected marking at the target location.

25. The system of claim 23, wherein the processor is to further execute the instructions to at least:

generate an interactive graphical user interface (GUI) to display the graphical representation of the selected marking superimposed onto the real-time image of the surface that includes the target location;

in response to a user input instruction via the GUI rejecting application of the selected marking at the target location, receive a user input via the GUI to adjust the target location to a modified target location; and compute a modified joint-space trajectory to enable the application tool to apply the selected marking at the modified target location based on the task plan data and the pose of the application tool, wherein the tool controller is configured to control the application tool to apply the marking at the modified target location based on the modified joint-space trajectory.

26. The system of claim 23, wherein the selected marking and/or target location covers a region extending beyond a reachability of the application tool, the processor is to further execute the instructions to intermittently re-compute the joint-space trajectory based on the task plan data and the pose of the application tool at each of a plurality of spaced apart locations, wherein the tool controller is configured to control the application tool to apply the marking at each of the spaced apart locations based on the re-computed joint-space trajectory.

27. The system of claim 22, wherein the processor is to further execute the instructions to at least:
- display an interactive graphical user interface (GUI); and
- in response to a user input instruction received via the GUI to provide a new marking, store new marking data in the non-transitory machine-readable media, the new marking data including a marking identifier to identify the new marking, a heading of the new marking and geospatial coordinates specifying a user-selected target location where the new marking to be applied.

\* \* \* \* \*